(12) United States Patent
Watanabe et al.

(10) Patent No.: US 10,625,355 B2
(45) Date of Patent: Apr. 21, 2020

(54) NUMERICAL CONTROL DEVICE

(71) Applicants: Mitsubishi Electric Corporation, Tokyo (JP); CITIZEN WATCH CO., LTD., Tokyo (JP); CITIZEN MACHINERY CO., LTD., Kitasaku-gun, Nagano (JP)

(72) Inventors: Mitsuo Watanabe, Tokyo (JP); Masakazu Sagasaki, Tokyo (JP); Yuki Hirata, Aichi (JP); Kazuhiko Sannomiya, Nagano (JP); Takaichi Nakaya, Nagano (JP)

(73) Assignees: Mitsubishi Electric Corporation, Chiyoda-ku, Tokyo (JP); CITIZEN WATCH CO., LTD, Nishitokyo-shi, Tokyo (JP); CITIZEN MACHINERY CO., LTD., Miyotamachi, Nagano (JP)

( * ) Notice: Subject to any disclaimer, the term of this patent is extended or adjusted under 35 U.S.C. 154(b) by 226 days.

(21) Appl. No.: 15/521,786

(22) PCT Filed: Oct. 28, 2014

(86) PCT No.: PCT/JP2014/078651
§ 371 (c)(1),
(2) Date: Apr. 25, 2017

(87) PCT Pub. No.: WO2016/067372
PCT Pub. Date: May 6, 2016

(65) Prior Publication Data
US 2018/0281090 A1  Oct. 4, 2018

(51) Int. Cl.
*B23G 3/08* (2006.01)
*B23G 1/02* (2006.01)
(Continued)

(52) U.S. Cl.
CPC .............. *B23G 3/08* (2013.01); *B23B 25/02* (2013.01); *B23G 1/02* (2013.01); *G05B 19/186* (2013.01);
(Continued)

(58) Field of Classification Search
CPC .. B23G 3/08; B23G 1/02; B23B 25/02; G05B 19/186; G05B 19/4093;
(Continued)

(56) References Cited

U.S. PATENT DOCUMENTS 4,419,912 A * 12/1983 Sotome ................. B23B 29/125
82/11.1
4,693,146 A 9/1987 Dombrowski et al.
(Continued)

FOREIGN PATENT DOCUMENTS

JP  58-143901 A  8/1983
JP  60-016301 A  1/1985
(Continued)

OTHER PUBLICATIONS

Communication dated Aug. 8, 2018 from the Korean Intellectual Property Office in counterpart application No. 10-2017-7014013.
(Continued)

*Primary Examiner* — Thomas C Lee
*Assistant Examiner* — Anzuman Sharmin
(74) *Attorney, Agent, or Firm* — Sughrue Mion, PLLC; Richard C. Turner

(57) ABSTRACT

A numerical control apparatus includes: a drive unit controlling a main shaft rotating a workpiece, a first drive shaft feeding a cutting tool relatively to the workpiece along a perpendicular direction to a lead direction of a thread, and a second drive shaft feeding the cutting tool relatively to the workpiece along the lead direction; and a vibration unit superimposing, on movement of the first drive shaft, vibra-
(Continued)

tion having a period having a predetermined ratio with a rotation period of the main shaft, and forms a thread on the workpiece by moving the cutting tool and the workpiece relative to each other and performing cut processes on the workpiece. The numerical control apparatus includes a thread-cutting vibration adjustment unit controlling the drive unit to shift phase of the vibration with respect to phase of the main shaft by a predetermined vibration phase shift amount every time in the cut processes.

4 Claims, 34 Drawing Sheets

(51) Int. Cl.
    *B23B 25/02*     (2006.01)
    *G05B 19/4093*     (2006.01)
    *G05B 19/18*     (2006.01)

(52) U.S. Cl.
    CPC .............. *G05B 19/4093* (2013.01); *G05B 2219/36198* (2013.01); *G05B 2219/45215* (2013.01); *G05B 2219/49055* (2013.01); *G05B 2219/49384* (2013.01); *Y02P 90/265* (2015.11)

(58) Field of Classification Search
    CPC ........... G05B 2219/36198; G05B 2219/45215; G05B 2219/49055; G05B 2219/49384; Y02P 90/265
    See application file for complete search history.

(56) References Cited

U.S. PATENT DOCUMENTS

| | | | |
|---|---|---|---|
| 5,778,745 A | 7/1998 | Furusawa et al. | |
| 7,044,830 B2 | 5/2006 | Sakagami et al. | |
| 2004/0128018 A1* | 7/2004 | Sugie | G05B 19/182 700/160 |
| 2013/0309034 A1* | 11/2013 | Inagaki | B23Q 17/0976 409/132 |
| 2014/0102268 A1 | 4/2014 | Hariki et al. | |
| 2017/0304920 A1* | 10/2017 | Sannomiya | B23G 3/00 |

FOREIGN PATENT DOCUMENTS

| | | | |
|---|---|---|---|
| JP | 09-029502 | A | 2/1997 |
| JP | 10-043901 | A | 2/1998 |
| JP | 10-043906 | A | 2/1998 |
| JP | 10-124127 | A | 5/1998 |
| JP | 2002-036001 | A | 2/2002 |
| JP | 2002-301601 | A | 10/2002 |
| JP | 2006-176365 | A | 7/2006 |
| JP | 4293132 | B2 | 7/2009 |
| JP | 5033929 | B1 | 9/2012 |
| JP | 5139591 | B1 | 2/2013 |
| JP | 5139592 | B1 | 2/2013 |
| JP | 2014-172110 | A | 9/2014 |
| WO | 2004/102290 | A1 | 11/2004 |

OTHER PUBLICATIONS

Communication dated Jun. 29, 2018 from the State Intellectual Property Office of the P.R.C. in counterpart Chinese application No. 201480083107.5.

Communication dated Jun. 8, 2018 from the European Patent Office in counterpart application 14905047.8.

International Search Report for PCT/JP2014/078651, dated Feb. 3, 2015.

Office Action dated Feb. 21, 2019 in Korean Application No. 10-2017-7014013.

\* cited by examiner

EXAMPLE OPERATION 1-1

VIBRATION CONDITION:
TWO VIBRATIONS FOR ONE ROTATION OF MAIN SHAFT
· FIRST TIME: VIBRATION PHASE SHIFT AMOUNT 0
· SECOND TIME: VIBRATION PHASE SHIFT AMOUNT 180°
  (CORRESPONDING TO 0.5 VIBRATIONS)
∗ IN FIRST TIME AND SECOND TIME,
· THREAD-CUTTING STARTING POSITION IN Z AXIS IS THE SAME
· THREAD-CUTTING START SHIFT ANGLE IS THE SAME (0°)

THERE IS PRELIMINARY MOVEMENT IN X AXIS

FIG.25

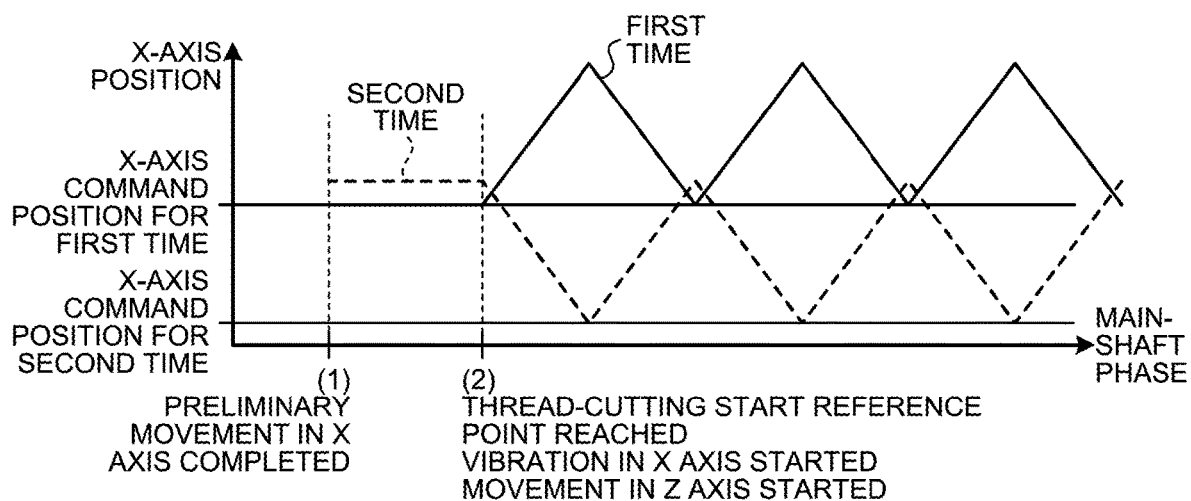

EXAMPLE OPERATIONS 1-1, 1-2

FIG.26

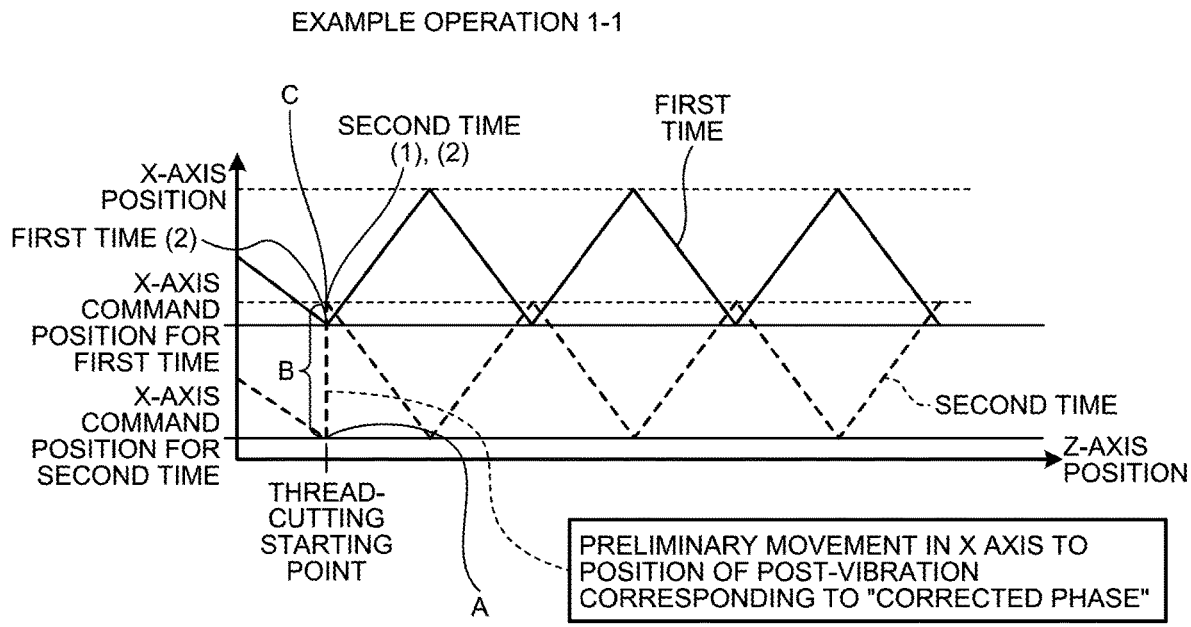

EXAMPLE OPERATION 1-1

FIG.27

EXAMPLE OPERATION 1-2

VIBRATION CONDITION:
TWO VIBRATIONS FOR ONE ROTATION OF MAIN SHAFT
· FIRST TIME: VIBRATION PHASE SHIFT AMOUNT 0
· SECOND TIME: VIBRATION PHASE SHIFT AMOUNT 180°
           (CORRESPONDING TO 0.5 VIBRATIONS)
           THREAD-CUTTING STARTING POSITION IN
           Z-AXIS DIFFERENT FROM THAT OF FIRST TIME
* IN FIRST TIME AND SECOND TIME,
· THREAD-CUTTING STARTING POSITION IN Z AXIS IS DIFFERENT
· THREAD-CUTTING START SHIFT ANGLE IS THE SAME (0°)

THERE IS PRELIMINARY MOVEMENT IN X AXIS

FIG.28

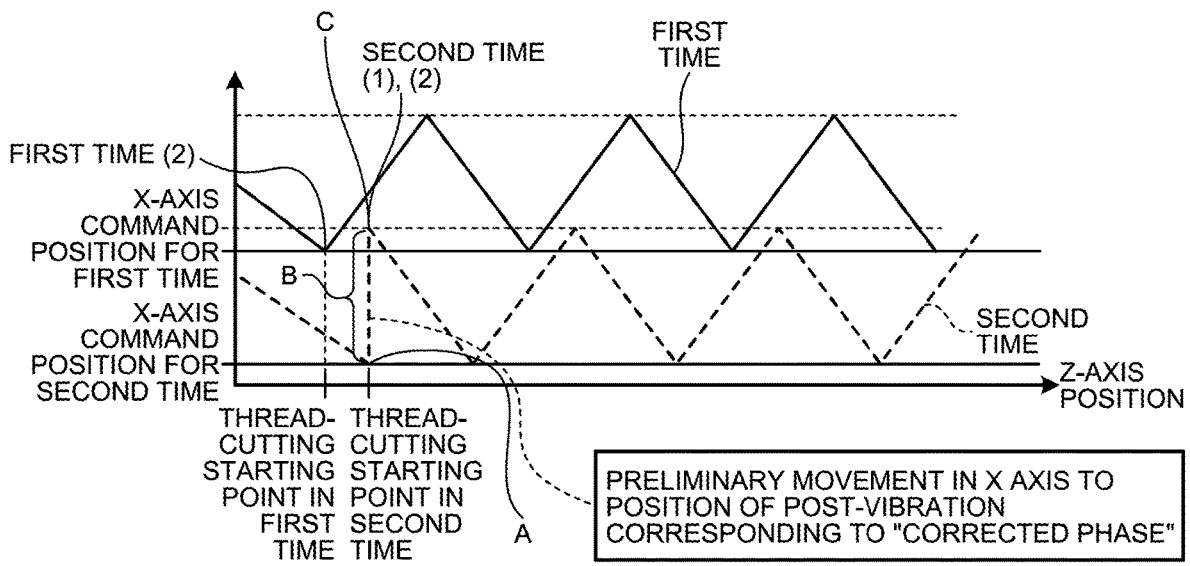

EXAMPLE OPERATION 1-2

FIG.29

EXAMPLE OPERATION 1-3

VIBRATION CONDITION:
TWO VIBRATIONS FOR ONE ROTATION OF MAIN SHAFT
· FIRST TIME: VIBRATION PHASE SHIFT AMOUNT 0
          THREAD-CUTTING START SHIFT ANGLE 0°
· SECOND TIME: VIBRATION PHASE SHIFT AMOUNT 180°
          (CORRESPONDING TO 0.5 VIBRATIONS)
          THREAD-CUTTING START SHIFT ANGLE
          DIFFERENT FROM THAT OF FIRST TIME
* IN FIRST TIME AND SECOND TIME,
· THREAD-CUTTING STARTING POSITION IN Z AXIS IS THE SAME
· THREAD-CUTTING START SHIFT ANGLE IS DIFFERENT

THERE IS PRELIMINARY MOVEMENT IN X AXIS

EXAMPLE OPERATIONS 1-3, 1-4

EXAMPLE OPERATION 1-3

FIG.32

NOTE:
DIAMETER-VALUE COMMAND FOR X AXIS
RADIUS-VALUE COMMAND FOR Z AXIS

| | |
|---|---|
| N01 G00 X11.0 Z100.0 | POSITIONING TO INITIAL POSITION |
| N02 M3 S1=1000 | MAIN-SHAFT ROTATION COMMAND |
| N03 G165 P3 X10.0 Q1.2 | G165 P3: VIBRATION THREAD-CUTTING MODE START COMMAND |
| N10 G00 X8.0 Z100.0 | (FIRST TIME) THREAD-CUTTING STARTING POINT |
| N11 G32 Z50.0 F2.5 Q0.0 | (FIRST TIME) THREAD CUTTING PROCESS (F: THREAD PITCH, Q: THREAD-CUTTING START SHIFT ANGLE) |
| N12 G00 X11.0 | (FIRST TIME) RUNOUT |
| N20 G00 Z100.0 | (SECOND TIME) Z-AXIS THREAD-CUTTING STARTING POSITION |
| N21 G00 X7.172 | (SECOND TIME) THREAD-CUTTING STARTING POINT |
| N22 G32 Z50.0 F2.5 Q325.584 | (SECOND TIME) THREAD CUTTING PROCESS |
| N23 G00 X11.0 | (SECOND TIME) RUNOUT |
| N30 G00 Z100.0 | (THIRD TIME) Z-AXIS THREAD-CUTTING STARTING POSITION |
| N31 G00 X6.536 | (THIRD TIME) THREAD-CUTTING STARTING POINT |
| N32 G32 Z50.0 F2.5 Q299.088 | (THIRD TIME) THREAD CUTTING PROCESS |
| N33 G00 X11.0 | (THIRD TIME) RUNOUT |
| N40 G00 Z100.0 | (FOURTH TIME) Z-AXIS THREAD-CUTTING STARTING POSITION |
| N41 G00 X6.5 | (FOURTH TIME) THREAD-CUTTING STARTING POINT |
| N42 G32 Z50.0 F2.5 Q297.648 A0.0 | (FOURTH TIME) THREAD CUTTING PROCESS (A: DESIGNATED AMPLITUDE AMOUNT) |
| N43 G00 X11.0 | (FOURTH TIME) RUNOUT |
| N50 G165 P0 | G165 P0: VIBRATION THREAD-CUTTING MODE FINISH COMMAND |

FIG.35

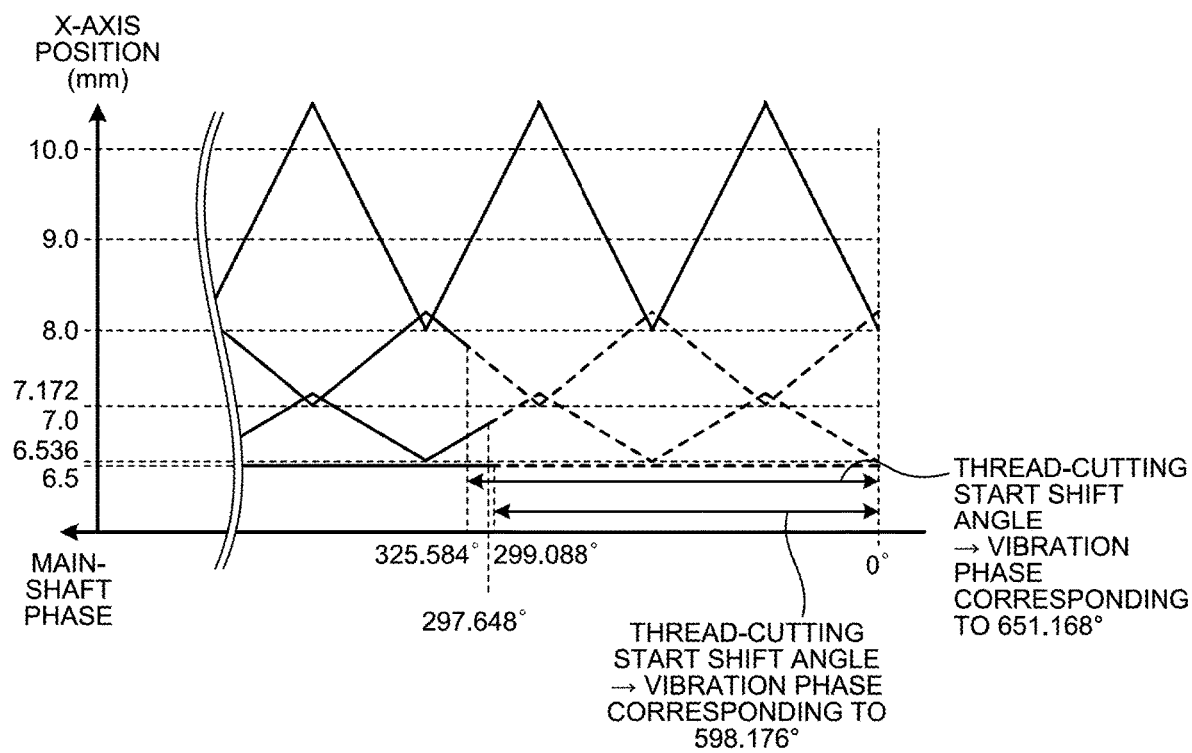

FIG.36

```
FIRST TIME
THREAD-CUTTING START SHIFT ANGLE    : 0°
VIBRATION PHASE SHIFT AMOUNT        : 0° × 2(TIME/r) = 0°
SECOND TIME
THREAD-CUTTING START SHIFT ANGLE    : 325.584°
VIBRATION PHASE SHIFT AMOUNT        : 325.584° × 2(TIME/r) = 651.168°
THIRD TIME
THREAD-CUTTING START SHIFT ANGLE    : 299.088°
VIBRATION PHASE SHIFT AMOUNT        : 299.088° × 2(TIME/r) = 598.176°
FOURTH TIME
→ AMPLITUDE = 0.0 mm IS DESIGNATED, THUS, NORMAL THREAD CUTTING
PROCESS WITH NO VIBRATION
```

FIG.37

EXAMPLE OPERATION 1-4

VIBRATION CONDITION:
TWO VIBRATIONS FOR ONE ROTATION OF MAIN SHAFT
· FIRST TIME: VIBRATION PHASE SHIFT AMOUNT 0
             THREAD-CUTTING START SHIFT ANGLE 0°
· SECOND TIME: VIBRATION PHASE SHIFT AMOUNT 180°
              (CORRESPONDING TO 0.5 VIBRATIONS)
              THREAD-CUTTING START SHIFT ANGLE
              DIFFERENT FROM THAT OF FIRST TIME
* IN FIRST TIME AND SECOND TIME,
· THREAD-CUTTING STARTING POSITION IN Z AXIS IS DIFFERENT
· THREAD-CUTTING START SHIFT ANGLE IS DIFFERENT

THERE IS PRELIMINARY MOVEMENT IN X AXIS

FIG.38

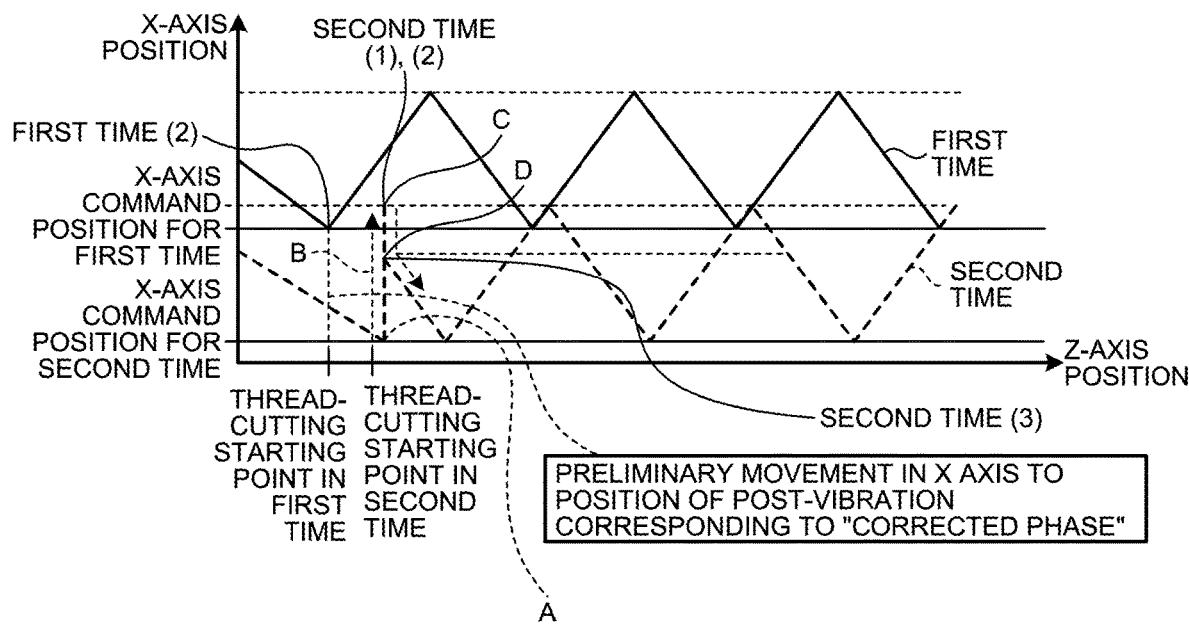

EXAMPLE OPERATION 2-1

VIBRATION CONDITION:
TWO VIBRATIONS FOR ONE ROTATION OF MAIN SHAFT
· FIRST TIME: VIBRATION PHASE SHIFT AMOUNT 0
· SECOND TIME: VIBRATION PHASE SHIFT AMOUNT 180°
              (CORRESPONDING TO 0.5 VIBRATIONS)
* IN FIRST TIME AND SECOND TIME,
· THREAD-CUTTING STARTING POSITION IN Z AXIS IS THE SAME
· THREAD-CUTTING START SHIFT ANGLE IS THE SAME (0°)

FIG.43

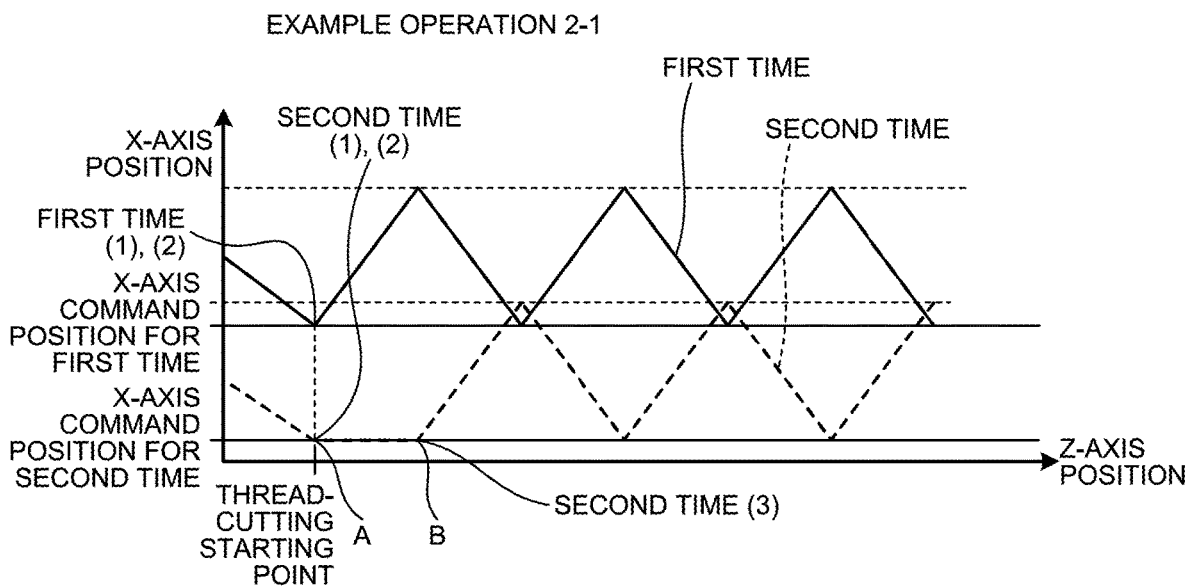

FIG.44

EXAMPLE OPERATION 2-2

VIBRATION CONDITION:
TWO VIBRATIONS FOR ONE ROTATION OF MAIN SHAFT
· FIRST TIME: VIBRATION PHASE SHIFT AMOUNT 0
· SECOND TIME: VIBRATION PHASE SHIFT AMOUNT 180°
(CORRESPONDING TO 0.5 VIBRATIONS)
THREAD-CUTTING STARTING POSITION IN
Z-AXIS DIFFERENT FROM THAT OF FIRST TIME
* IN FIRST TIME AND SECOND TIME,
· THREAD-CUTTING STARTING POSITION IN Z AXIS IS DIFFERENT
· THREAD-CUTTING START SHIFT ANGLE IS THE SAME (0°)

FIG.45

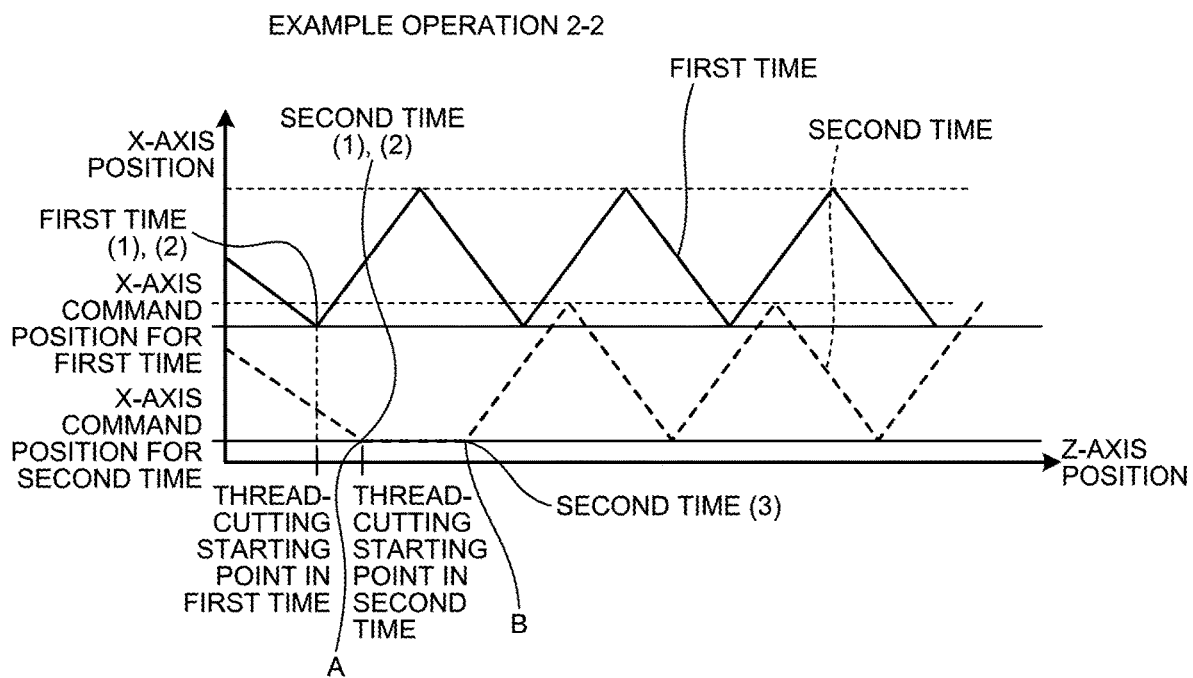

FIG.46

EXAMPLE OPERATION 2-3

VIBRATION CONDITION:
TWO VIBRATIONS FOR ONE ROTATION OF MAIN SHAFT
· FIRST TIME: VIBRATION PHASE SHIFT AMOUNT 0
　　　　　　　THREAD-CUTTING START SHIFT ANGLE 0°
· SECOND TIME: VIBRATION PHASE SHIFT AMOUNT 180°
　　　　　　　(CORRESPONDING TO 0.5 VIBRATIONS)
　　　　　　　THREAD-CUTTING START SHIFT ANGLE
　　　　　　　DIFFERENT FROM THAT OF FIRST TIME
* IN FIRST TIME AND SECOND TIME,
· THREAD-CUTTING STARTING POSITION IN Z AXIS IS THE SAME
· THREAD-CUTTING START SHIFT ANGLE IS DIFFERENT

FIG.51

EXAMPLE OPERATION 2-4

VIBRATION CONDITION:
TWO VIBRATIONS FOR ONE ROTATION OF MAIN SHAFT
· FIRST TIME: VIBRATION PHASE SHIFT AMOUNT 0
              THREAD-CUTTING START SHIFT ANGLE 0°
· SECOND TIME: VIBRATION PHASE SHIFT AMOUNT 180°
               (CORRESPONDING TO 0.5 VIBRATIONS)
               THREAD-CUTTING START SHIFT ANGLE
               DIFFERENT FROM THAT OF FIRST TIME
* IN FIRST TIME AND SECOND TIME,
· THREAD-CUTTING STARTING POSITION IN Z AXIS IS DIFFERENT
· THREAD-CUTTING START SHIFT ANGLE IS DIFFERENT

FIG.52

EXAMPLE OPERATION 2-4

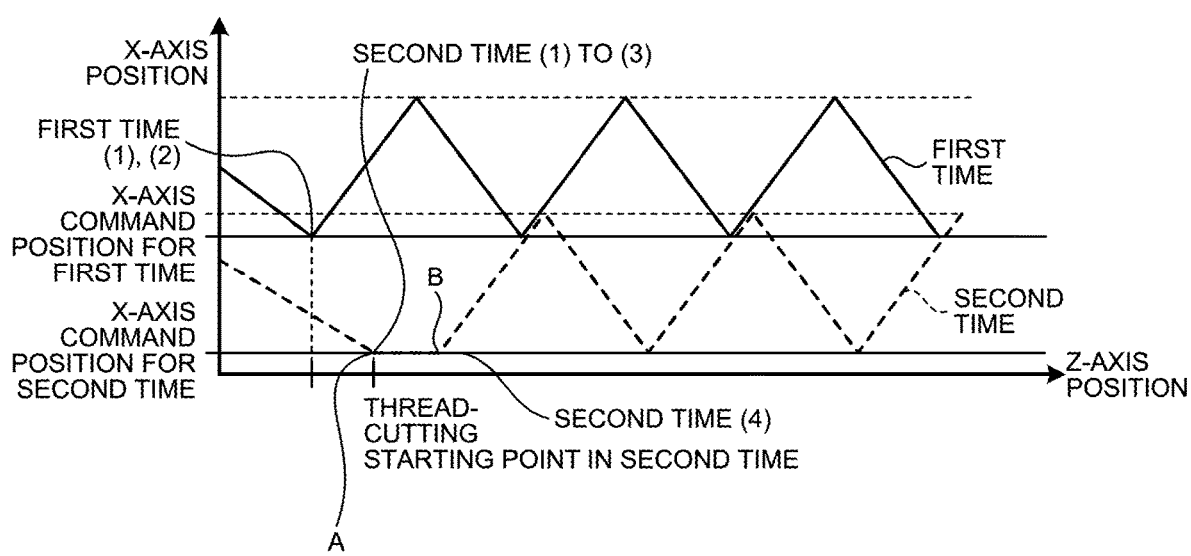

FIG.53

| | |
|---|---|
| N01 G00 X11.0 Z100.0 | POSITIONING TO INITIAL POSITION |
| N02 M3 S1=1000 | MAIN-SHAFT ROTATION COMMAND |
| N03 G165 P3 X10.0 Q1.2 | G165 P0: VIBRATION THREAD-CUTTING MODE FINISH COMMAND |
| N10 G00 X7.0 Z100.0 | (FIRST TIME) THREAD-CUTTING STARTING POINT |
| N11 G32 Z50.0 F2.5 | (FIRST TIME) THREAD CUTTING PROCESS (F: THREAD PITCH) |
| N12 G00 X11.0 | (FIRST TIME) RUNOUT |
| N20 G00 Z100.0 | (SECOND TIME) Z-AXIS THREAD-CUTTING STARTING POSITION |
| N21 G00 X7.0 | (SECOND TIME) THREAD-CUTTING STARTING POINT |
| N22 G32 Z50.0 F2.5 A3.6 R120 | (SECOND TIME) THREAD CUTTING PROCESS (A: DESIGNATED AMPLITUDE AMOUNT, R: DESIGNATED VIBRATION PHASE SHIFT AMOUNT) |
| N23 G00 X11.0 | (SECOND TIME) RUNOUT |
| N30 G00 Z100.0 | (THIRD TIME) Z-AXIS THREAD-CUTTING STARTING POSITION |
| N31 G00 X7.0 | (THIRD TIME) THREAD-CUTTING STARTING POINT |
| N32 G32 Z50.0 F2.5 A3.6 R240 | (THIRD TIME) THREAD CUTTING PROCESS (A: DESIGNATED AMPLITUDE AMOUNT, R: DESIGNATED VIBRATION PHASE SHIFT AMOUNT) |
| N33 G00 X11.0 | (THIRD TIME) RUNOUT |
| N40 G00 Z100.0 | (FOURTH TIME) Z-AXIS THREAD-CUTTING STARTING POSITION |
| N41 G00 X6.5 | (FOURTH TIME) THREAD-CUTTING STARTING POINT |
| N42 G32 Z50.0 F2.5 A0.0 | (FOURTH TIME) THREAD CUTTING PROCESS (A: DESIGNATED AMPLITUDE AMOUNT) |
| N43 G00 X11.0 | (FOURTH TIME) RUNOUT |
| N50 G165 P0 | G165 P0: VIBRATION THREAD-CUTTING MODE FINISH COMMAND |

# NUMERICAL CONTROL DEVICE

CROSS REFERENCE TO RELATED APPLICATIONS

This is a National Stage of International Application No. PCT/JP2014/078651 filed Oct. 28, 2014, the contents of all of which are incorporated herein by reference in their entirety.

FIELD

The present invention relates to a numerical control apparatus that controls a movement of a workpiece and a tool that machines the workpiece relative to each other.

BACKGROUND

Numerical control apparatuses for turning have been proposed that includes a cutting-tool feeding mechanism that feeds a cutting tool toward a workpiece and a control mechanism that enables the cutting tool to vibrate at low frequency and controls a cutting-tool feed drive motor (see Patent Literatures 1 to 3). The control mechanism in such numerical control apparatuses includes an operation unit that sets various settings; a vibration cutting information storage unit that stores, in advance in the form of a table, at least the advancement amount, retreat amount, advancement speed, and retreat speed of the cutting tool feed mechanism that correspond to the inertia of the feed shaft or machine characteristics such as motor characteristics according to the rotation speed of the workpiece or the feed amount of the cutting tool per rotation of the cutting tool that is set by the operation unit, as data with which the cutting tool can operate at a low frequency of 25 Hz or higher with which the cutting tool is synchronously fed; and a motor control unit that controls the cutting-tool feed drive motor on the basis of the data stored in the vibration cutting information storage unit. Thus, advancement and retreat are repeated along an interpolated path, thereby generating low-frequency vibrations. Additionally, a technique to superimpose vibration in a designated angular direction for contour control has been disclosed (see Patent Literature 4).

CITATION LIST

Patent Literature

Patent Literature 1: Japanese Patent No. 5033929
Patent Literature 2: Japanese Patent No. 5139591
Patent Literature 3: Japanese Patent No. 5139592
Patent Literature 4: Japanese Patent No. 4293132

SUMMARY

Technical Problem

As to control performed when vibration in the perpendicular direction to the thread lead direction is superimposed in a low-frequency vibration thread cutting process in which the contour control and the main shaft rotation phase are synchronized and controlled, the conventional techniques described above do not disclose a machining method performed with the phase or amplitude of vibration adjusted in accordance with the number of times cutting is performed.

The present invention has been achieved in view of the above, and an object of the present invention is to provide a numerical control apparatus that enables vibration to separate chips by adjusting the phase of vibration appropriately each time cutting is performed in a low-frequency vibration thread cutting process.

Solution to Problem

In order to solve the above problems and achieve the object, an aspect of the present invention is a numerical control apparatus that includes: a drive unit to control a main shaft that rotates a workpiece, a first drive shaft that feeds to move a cutting tool relatively to the workpiece along a perpendicular direction to a lead direction of a thread to be formed in a machining process, and a second drive shaft that feeds to move the cutting tool relatively to the workpiece along the lead direction; and a vibration unit to superimpose, on a movement of the first drive shaft, a vibration that is a reciprocating feed movement having a period having a predetermined ratio with a rotation period of the main shaft, and that performs a thread cutting process for forming a thread on the workpiece by moving the cutting tool and the workpiece relative to each other and performing a cut process more than once on the workpiece. The numerical control apparatus includes: a thread-cutting vibration adjustment unit to control the drive unit such that a phase of the vibration is shifted with respect to a phase of the main shaft by a predetermined vibration phase shift amount every time in the cut process performed more than once.

Advantageous Effects of Invention

A numerical control apparatus according to the present invention produces an effect of enabling vibration to separate chips by adjusting the phase of vibration appropriately each time cutting is performed in a low-frequency vibration thread cutting process.

BRIEF DESCRIPTION OF DRAWINGS

FIG. 24 is a diagram illustrating a vibration condition for an example operation 1-1 in the second embodiment.

FIG. 25 is a diagram illustrating the relationship between the main-shaft phase and the X-axis position of the example operation 1-1 and an example operation 1-2 in the second embodiment.

FIG. 26 is a diagram illustrating the relationship between the Z-axis position and the X-axis position of the example operation 1-1 in the second embodiment.

FIG. 27 is a diagram illustrating a vibration condition for the example operation 1-2 in the second embodiment.

FIG. 28 is a diagram illustrating the relationship between the Z-axis position and the X-axis position of the example operation 1-2 in the second embodiment.

FIG. 29 is a diagram illustrating a vibration condition for an example operation 1-3 in the second embodiment.

FIG. 32 is a diagram illustrating an example of the machining program of the example operation 1-3 in the second embodiment.

FIG. 35 is a diagram illustrating the relationship between the main-shaft phase and the X-axis position in a case in which the machining program in FIG. 32 is executed in the second embodiment.

FIG. 36 is a diagram illustrating a shift amount of the vibration phase corresponding to the "thread-cutting start shift angle" used every time in a case in which the machining program in FIG. 32 is executed in the second embodiment.

FIG. 37 is a diagram illustrating a vibration condition for the example operation 1-4 in the second embodiment.

FIG. 38 is a diagram illustrating the relationship between the Z-axis position and the X-axis position of the example operation 1-4 in the second embodiment.

FIG. 43 is a diagram illustrating the relationship between the Z-axis position and the X-axis position of the example operation 2-1 in the third embodiment.

FIG. 44 is a diagram illustrating a vibration condition for the example operation 2-2 in the third embodiment.

FIG. 45 is a diagram illustrating the relationship between the Z-axis position and the X-axis position of the example operation 2-2 in the third embodiment.

FIG. 46 is a diagram illustrating a vibration condition for an example operation 2-3 in the third embodiment.

FIG. 51 is a diagram illustrating a vibration condition for the example operation 2-4 in the third embodiment.

FIG. 52 is a diagram illustrating the relationship between the Z-axis position and the X-axis position of the example operation 2-4 in the third embodiment.

FIG. 53 is a diagram illustrating an example of the machining program in the fourth embodiment.

DESCRIPTION OF EMBODIMENTS

A numerical control apparatus according to embodiments of the present invention will now be described in detail with reference to the drawings. The present invention is not limited to the embodiments.

First Embodiment

Figure 1:
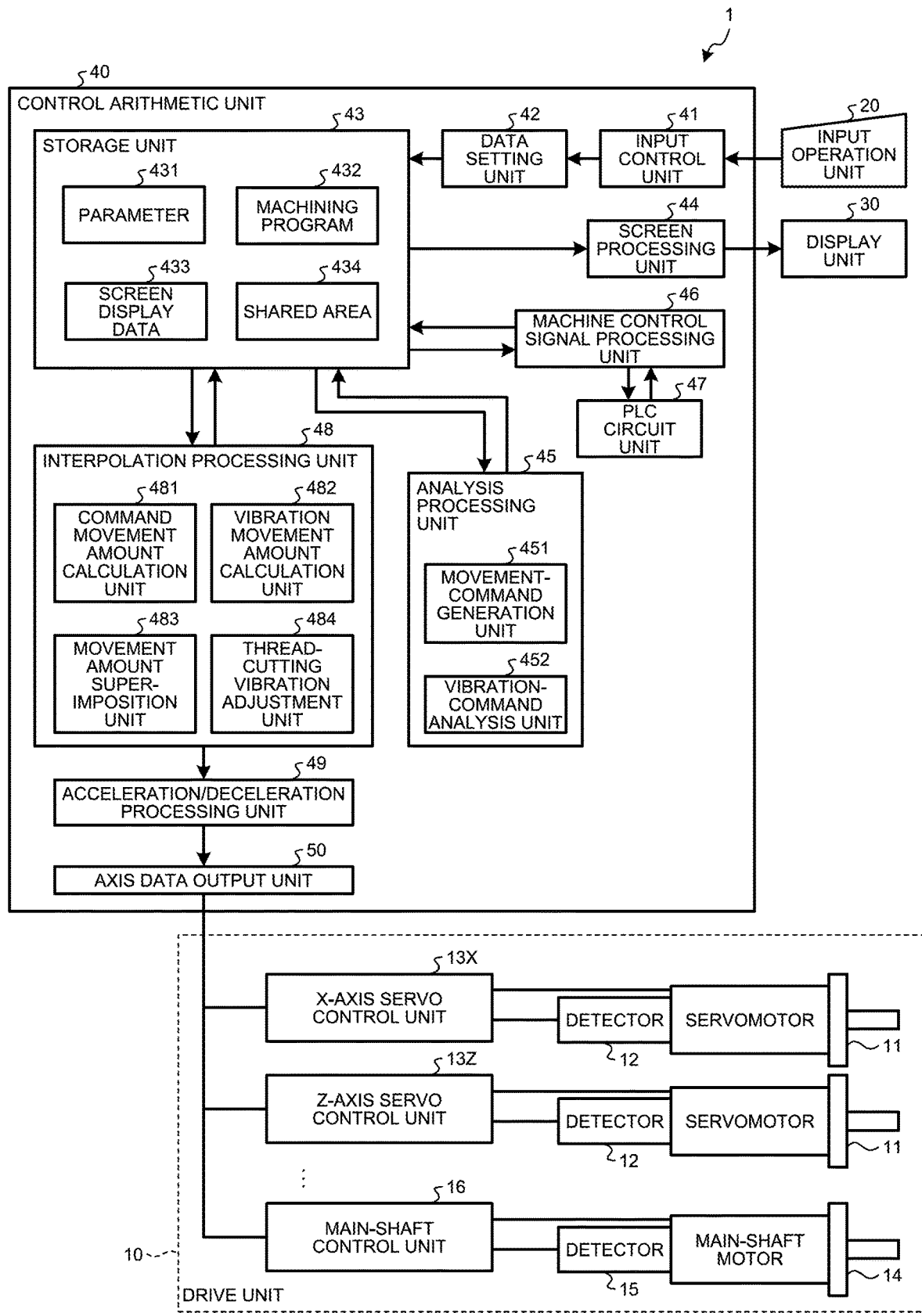
FIG. 1 is a block diagram illustrating an exemplary configuration of a numerical control apparatus according to first to fourth embodiments of the present invention.

FIG. 1 is a block diagram illustrating an exemplary configuration of a numerical control apparatus 1 according to a first embodiment. The numerical control apparatus 1 includes a drive unit 10, which drives at least one of a workpiece and a tool, an input operation unit 20, which is formed by an input unit, a display unit 30, which is formed by a display unit, and a control arithmetic unit 40, which analyzes a machining program and performs interpolation processing.

The drive unit 10 is a mechanism that drives one of a workpiece and a tool or both of them in at least two axial directions. The drive unit 10 controls at least an X axis, which is a first drive shaft, and a Z axis, which is a second drive shaft, so that the shafts are driven. The drive unit 10 includes servomotors 11, each of which enables the workpiece or the tool to move in a corresponding axial direction defined by the numerical control apparatus 1, detectors 12, each of which detects the position and the speed of a corresponding one of the servomotors 11, and an X-axis servo control unit 13X and a Z-axis servo control unit 13Z, each of which controls the position and the speed of the workpiece or the tool in a corresponding one of the axial directions on the basis of the position and the speed detected by the corresponding one of the detectors 12. The numerical control apparatus 1 according to the first embodiment moves the tool and the workpiece relative to each other along a movement path by using these drive shafts provided to the tool or the workpiece while vibrating them so as to machine the workpiece.

The drive unit 10 also includes a main-shaft motor 14, which rotates a main shaft that retains the workpiece, a detector 15, which detects the position and the rotational speed of the main-shaft motor 14, and a main-shaft control unit 16, which controls the rotation of the main shaft on the basis of the position and the rotational speed detected by the detector 15.

The input operation unit 20 includes the input unit, such as a keyboard, a button, or a mouse, and enables a user to input a command for the numerical control apparatus 1 or to input a machining program, a parameter, or the like. The display unit 30 includes the display unit, such as a liquid crystal display, and displays information resulting from the processing by the control arithmetic unit 40.

The control arithmetic unit 40 includes an input control unit 41, a data setting unit 42, a storage unit 43, a screen processing unit 44, an analysis processing unit 45, a machine control signal processing unit 46, a PLC (Programmable Logic Controller) circuit unit 47, an interpolation processing unit 48, an acceleration/deceleration processing unit 49, and an axis data output unit 50.

The input control unit 41 receives information input from the input operation unit 20. The data setting unit 42 stores the information received by the input control unit 41 in the storage unit 43. For example, if the result of editing of a machining program 432 is input, the input control unit 41 causes the machining program 432 stored in the storage unit 43 to reflect the result of editing, and if information to serve as a parameter is input, the input control unit 41 stores it in a storage area for a parameter 431 in the storage unit 43.

The storage unit 43 stores information such as the parameter 431 to be used for the processing of the control arithmetic unit 40, the machining program 432 to be executed, and screen display data 433 to be displayed on the display unit 30. The storage unit 43 also includes a shared area 434, which stores data to be temporarily used except the parameter 431 and the machining program 432. The screen processing unit 44 performs control such that the screen display data 433 in the storage unit 43 is displayed on the display unit 30.

The analysis processing unit 45 includes a movement-command generation unit 451, which reads the machining program 432 including one or more blocks, analyzes every block of the machining program 432 that has been read, reads a movement path and a feed speed, and generates a movement command for movement to be made in one block, and a vibration-command analysis unit 452, which analyzes the machining program 432 to determine whether a vibration command is contained and, if a vibration command is contained, provides a vibration condition contained in the vibration command to the interpolation processing unit 48. A vibration condition generated by the vibration-command analysis unit 452 includes, for example, an amplitude of a low frequency vibration.

When an auxiliary command that is a command for operating the machine and that is not one of the commands to operate the drive shafts, which are shafts to be numerically controlled, is read by the analysis processing unit 45, the machine control signal processing unit 46 notifies the PLC circuit unit 47 of the issuance of the auxiliary command. Upon receipt of the notification of issuance of the auxiliary command from the machine control signal processing unit 46, the PLC circuit unit 47 performs processing corresponding to the issued auxiliary command.

The interpolation processing unit 48 includes a command movement amount calculation unit 481, which, by using a movement command analyzed by the analysis processing unit 45, calculates a command movement amount that is a movement amount by which movement is made at a designated feed speed during a processing period that is a period of control of the numerical control apparatus 1, a vibration movement amount calculation unit 482, which calculates a vibration movement amount that is a movement amount for vibrating the tool or the workpiece during the processing period, a movement amount superimposition unit 483, which calculates a superimposition movement amount resulting from superimposition of a command movement amount and a vibration movement amount per processing period, and a thread-cutting vibration adjustment unit 484, which adjusts a phase of vibration at the start of a vibration thread cutting process. The processing period is also referred to as an interpolation period.

The acceleration/deceleration processing unit 49 converts a superimposition movement amount output from the interpolation processing unit 48 for each of the drive shafts to a movement command per processing period according to a predesignated acceleration/deceleration pattern such that the movement command allows for acceleration and deceleration. The axis data output unit 50 outputs a movement command per processing period resulting from the processing by the acceleration/deceleration processing unit 49 to the X-axis servo control unit 13X and the Z-axis servo control unit 13Z, each of which controls a corresponding one of the drive shafts, and to the main-shaft control unit 16.

Figure 2:
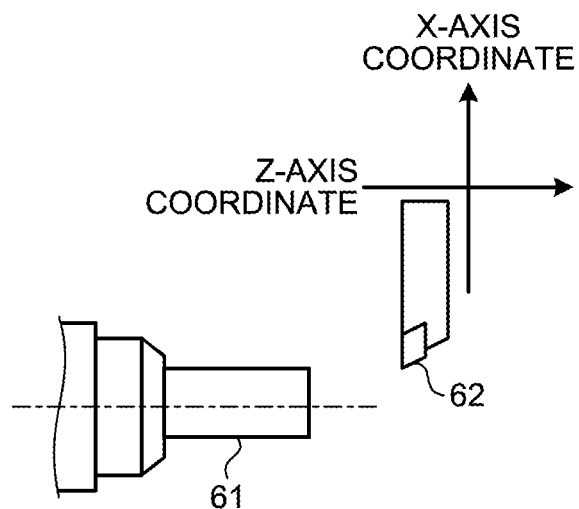
FIG. 2 is a diagram illustrating a case in which only a tool is moved in a Z-axis direction and an X-axis direction in the first embodiment.
Figure 3:
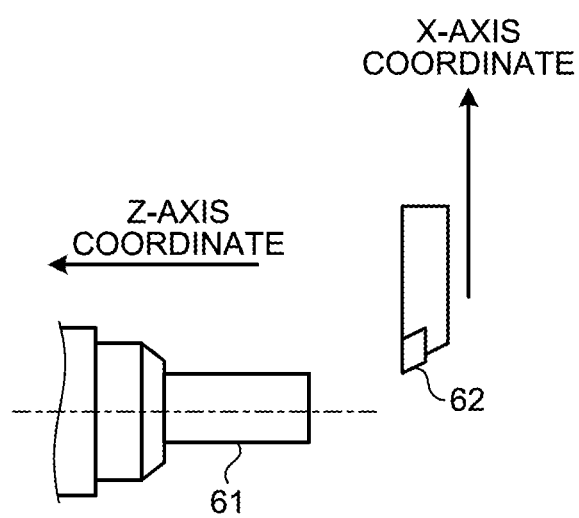
FIG. 3 is a diagram illustrating a case in which a workpiece is moved in the Z-axis direction and the tool is moved in the X-axis direction in the first embodiment.

To perform machining while a cutting tool or a workpiece is vibrated, the workpiece and the cutting tool should be moved relative to each other during the machining, as described above. FIG. 2 and FIG. 3 are diagrams schematically illustrating the configurations of axes of the numerical control apparatus 1 according to the first embodiment, which performs a turning process. In FIG. 2 and FIG. 3, the Z axis and the X axis, which are orthogonal to each other on a paper plane, are provided. FIG. 2 is a diagram illustrating a case in which a workpiece 61 is fixed, and a tool 62, which is a cutting tool for performing the turning process, is moved in a Z-axis direction and an X-axis direction. FIG. 3 is a diagram illustrating a case in which the workpiece 61 is moved in the Z-axis direction, and the tool 62 is moved in the X-axis direction. In each of the cases in FIG. 2 and FIG. 3, a low-frequency vibration thread cutting process to be described hereinafter can be performed when both or one of the workpiece 61 and the tool 62, which are/is to be moved, are/is equipped with the servomotors 11 and the workpiece 61 is equipped with the main-shaft motor 14.

Figure 4:
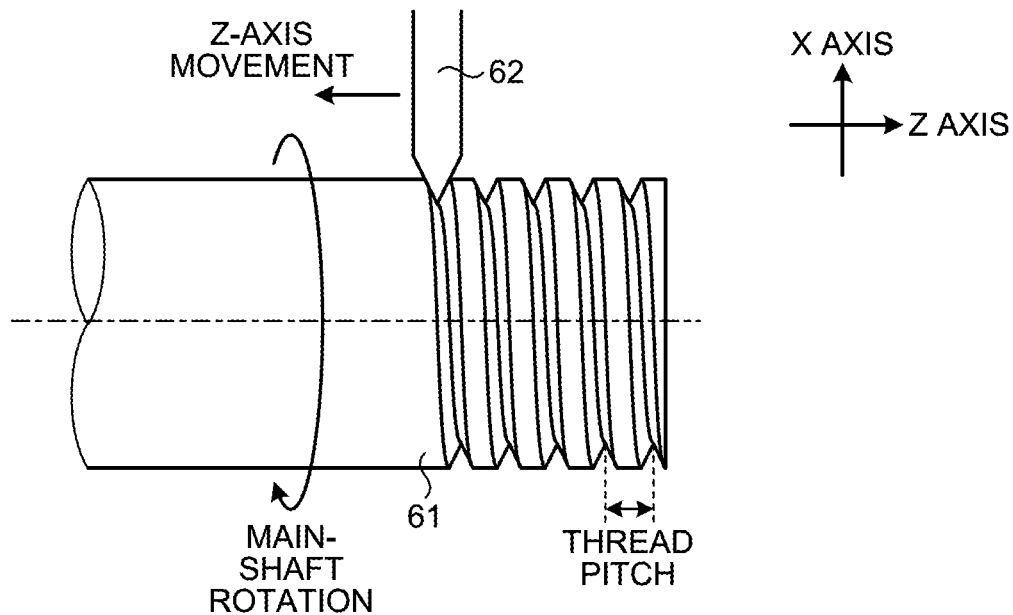
FIG. 4 is a diagram illustrating a thread cutting process being performed in the first embodiment.

A thread cutting process involving no low frequency vibration will be described first. FIG. 4 is a diagram illustrating a thread cutting process being performed. The description below assumes that a lead axis, which is a feed axis that moves along a lead direction of a thread to be formed, is the Z axis and that a feed axis that moves along a perpendicular direction to the lead axis is the X axis. The lead direction is the direction of a rotation axis of the main shaft.

As illustrated in FIG. 4, the workpiece 61 is rotated by the rotation of the main shaft, and the tool 62 is moved in the Z-axis direction, which is the lead direction. In a normal thread cutting process, cutting is repeated more than once to form a thread groove, and thus, the position of the feed axis in the Z-axis direction is synchronized with the rotation phase of the main shaft for machining to form a thread. If each of the rotational speed of the main shaft and the moving speed in the Z-axis direction is a constant speed, thread grooves having evenly spaced thread pitches are formed.

Figure 5:
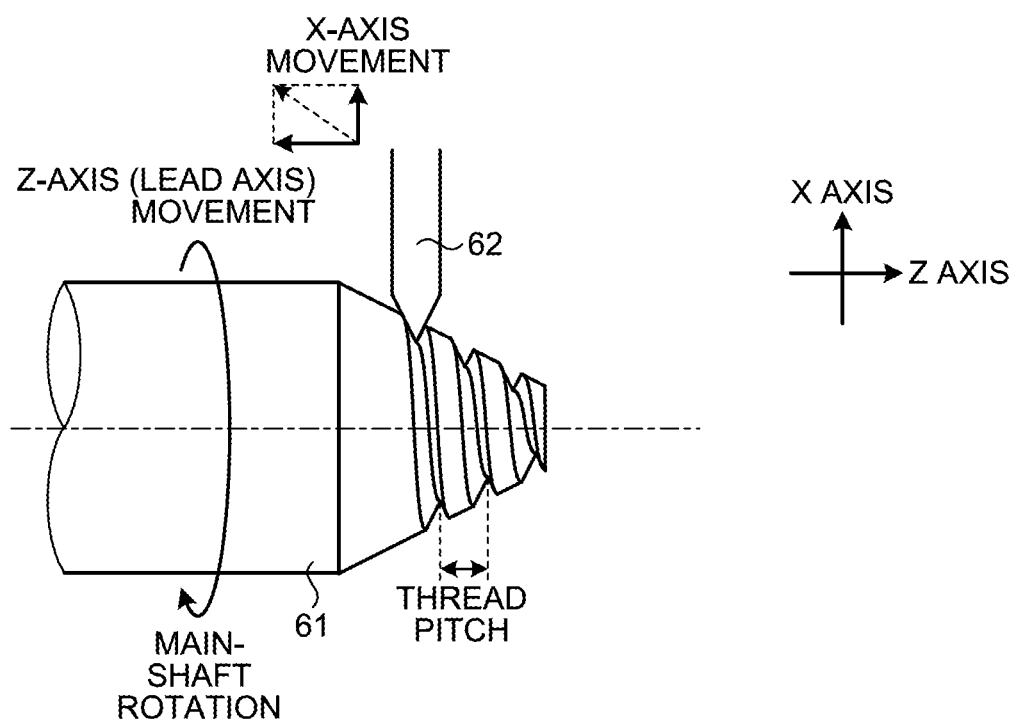
FIG. 5 is a diagram illustrating a thread cutting process being performed on a taper screw in the first embodiment.

FIG. 5 is a diagram illustrating a thread cutting process being performed on a taper screw having taper. When the numerical control apparatus 1 performs interpolation of movements in the direction of the Z axis, which is the lead axis of the taper screw, and in the direction of the X axis, which is an axis perpendicular to the lead axis, the position of the feed axis in the direction of the lead axis is also synchronized with the rotation phase of the main shaft for machining to form a thread.

Figure 6:
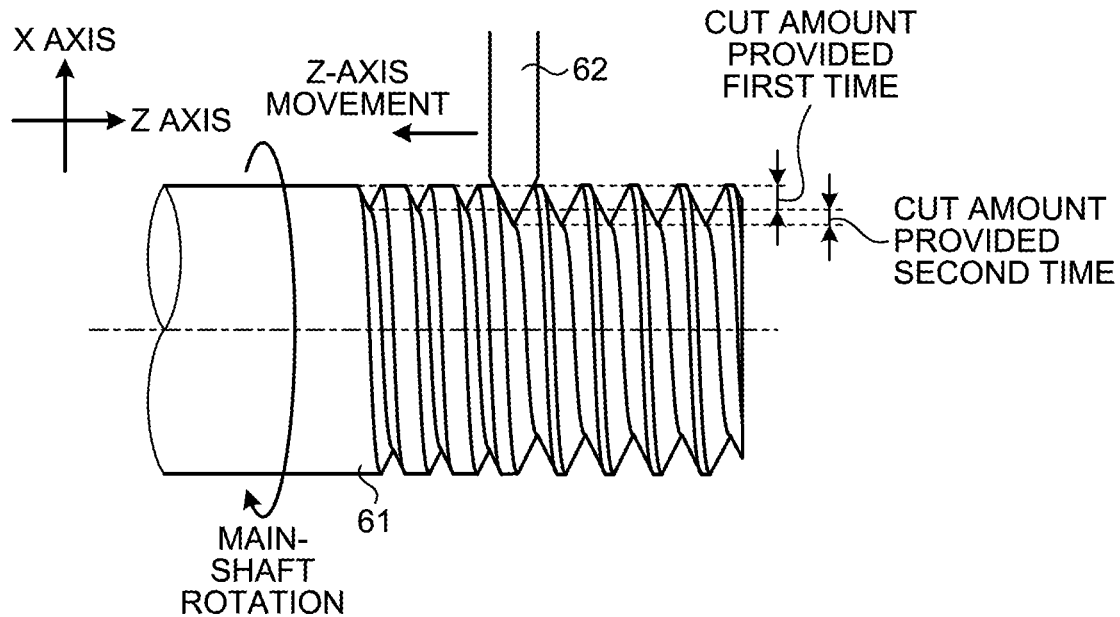
FIG. 6 is a diagram illustrating a thread cutting process in which cutting is performed more than once in the first embodiment.

In a case in which a thread cutting process is performed as illustrated in FIG. 4, cutting is normally performed more than once in such a manner that a groove of a thread is machined more deeply during cutting performed the second time than during the cutting performed the first time. A thread cutting process in which cutting is performed more than once is illustrated in FIG. 6. As illustrated in FIG. 6, a cut amount resulting from the first time and a cut amount resulting from the second time are added together to obtain a value for the depth of a groove after the cutting performed the second time. In this case, the relationship between a feed amount of a feed axis and a main-shaft rotation amount remains identical while a cut process is performed more than once, so that thread grooves having an identical shape except the cut amounts are formed in the cut process performed more than once. The phase of the main shaft, i.e., its angle, at the start of the thread cutting operation, i.e., at the start of movement of the lead axis, can be designated with the machining program 432. Specifically, a reference point of the phase can be set using an installation angle of the detector 15 or the parameter 431, and a "thread-cutting start shift angle", which is an angle from the reference point of the phase, can be designated with the machining program 432. For example, cutting can be performed at an identical location each time by causing a thread-cutting shift angle and a Z-axis position at the start of cutting to be identical in each time of cutting.

Figure 7:
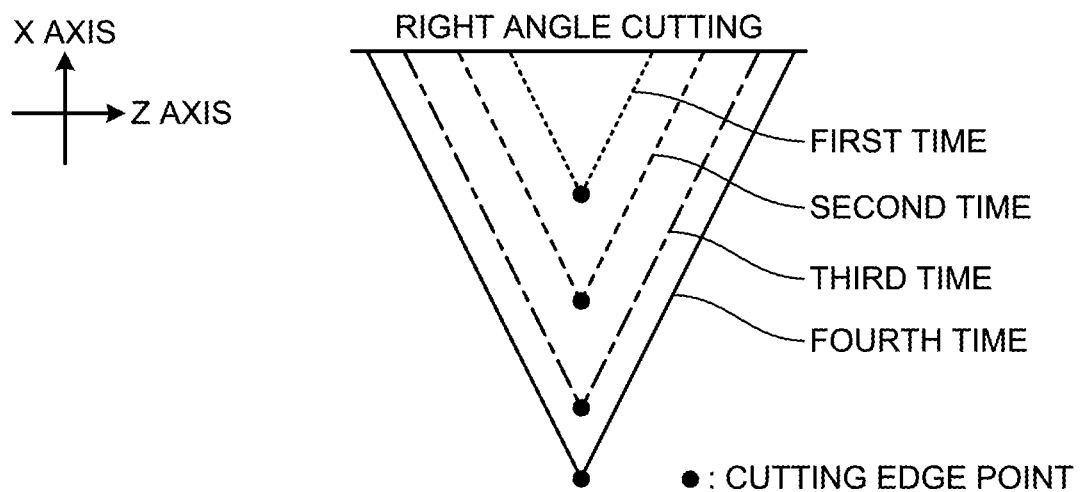
FIG. 7 is a diagram illustrating a cutting pattern for "right angle cutting" in the first embodiment.
Figure 8:
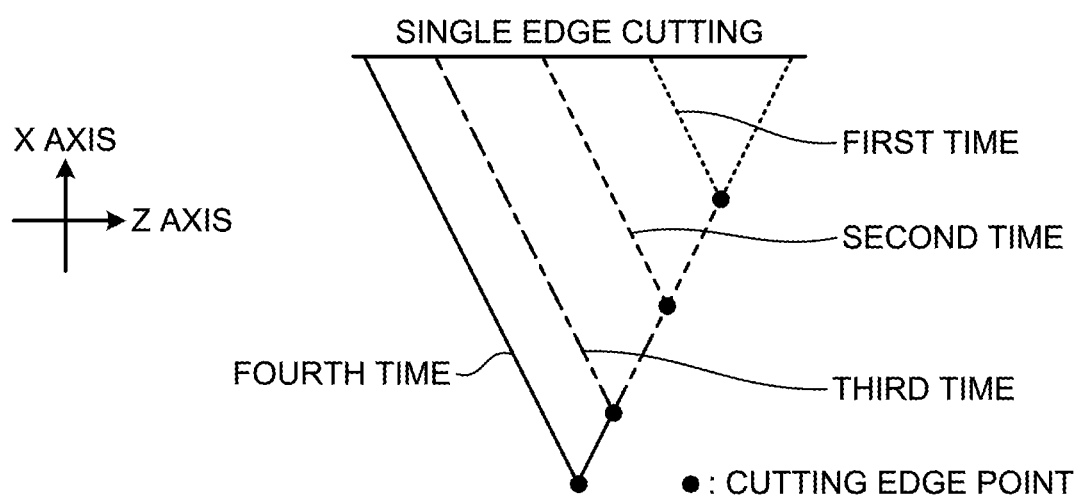
FIG. 8 is a diagram illustrating a cutting pattern for "single edge cutting" in the first embodiment.
Figure 9:
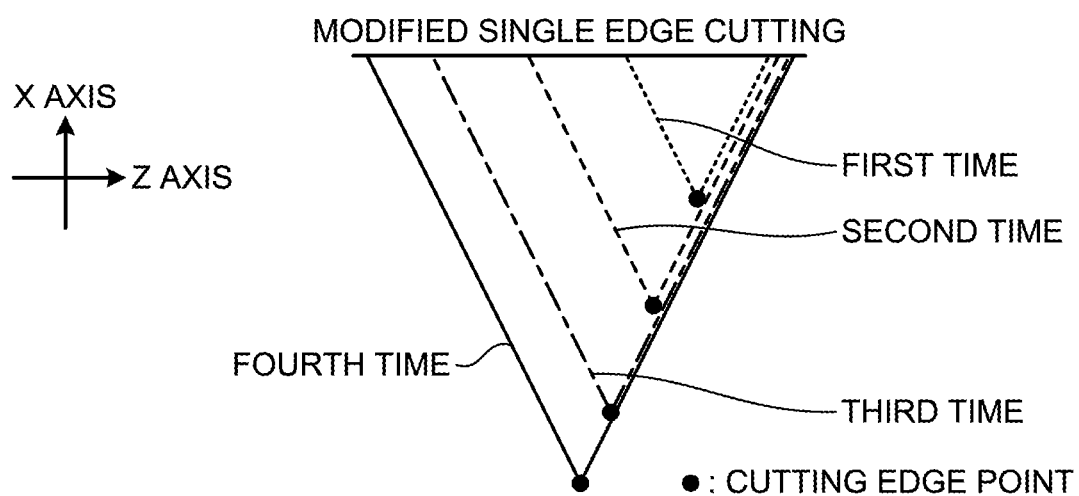
FIG. 9 is a diagram illustrating a cutting pattern for "modified single edge cutting" in the first embodiment.
Figure 10:
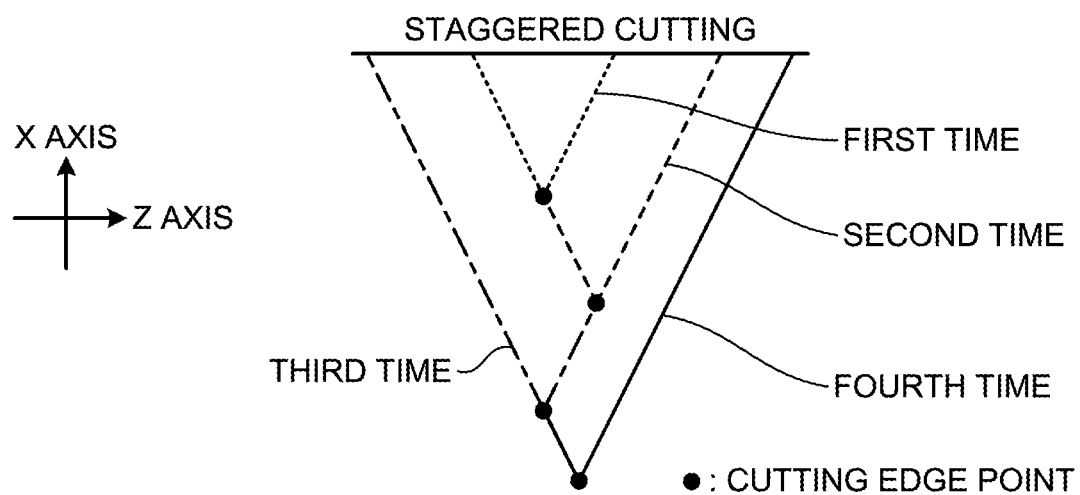
FIG. 10 is a diagram illustrating a cutting pattern for "staggered cutting" in the first embodiment.

Typical cutting patterns for use in a thread cutting process when the cutting is performed more than once are illustrated in FIG. 7 to FIG. 10. FIG. 7 to FIG. 10 illustrate portions to be cut during cutting performed more than once in a cross section of a thread groove at any one location. FIG. 7 illustrates a cutting pattern for "right angle cutting", in which the Z-axis coordinate of a cutting edge of the tool 62 is the same every time. FIG. 8 to FIG. 10 illustrate cutting patterns in which the Z-axis coordinate of the cutting edge is different every time.

FIG. 8 illustrates a cutting pattern for "single edge cutting". FIG. 9 illustrates a cutting pattern for "modified single edge cutting". FIG. 10 illustrates a cutting pattern for "staggered cutting". The cutting patterns of FIG. 8 to FIG. 10, in which the Z-axis coordinate is different every time, produce an effect of varying directions in which chips scatter.

An operation including movement of a cutting edge of the tool 62 in the Z-axis direction after the start of cutting will now be described in the case of the "right angle cutting", in which the Z-axis coordinate of the cutting edge at a thread-cutting start point is the same every time, and in the case of the "single edge cutting", in which the Z-axis coordinate of the cutting edge at the thread-cutting start point is different every time.

Figure 11:
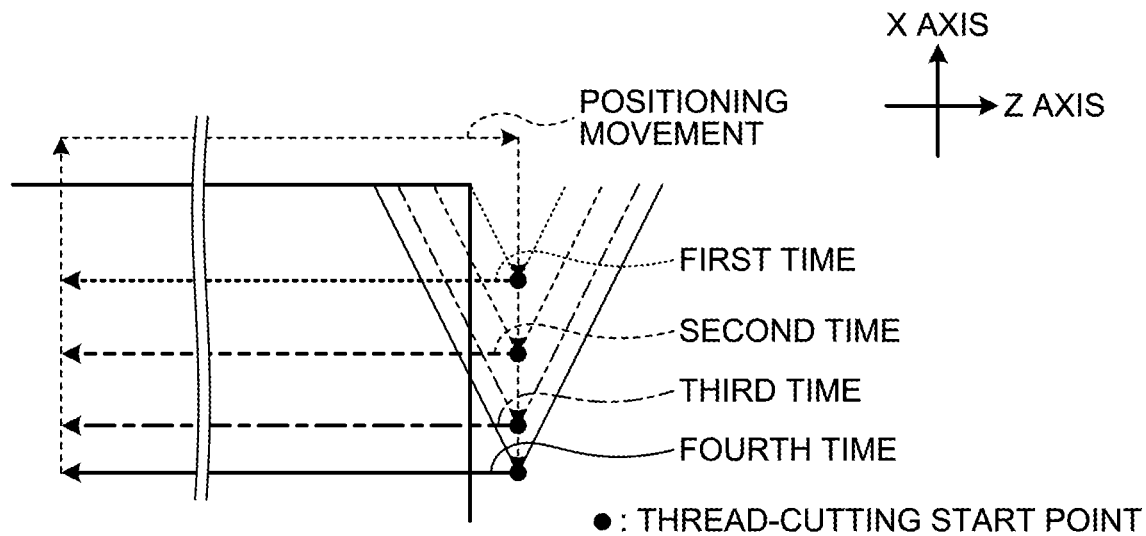
FIG. 11 is a diagram illustrating a track of a cutting edge point accomplished every time in a case in which the Z-axis coordinate of the cutting edge at a thread-cutting start point is the same every time in the first embodiment.

FIG. 11 illustrates a track of a cutting edge point accomplished every time in the case of the "right angle cutting", in which the Z-axis coordinate of the cutting edge at the thread-cutting start point is the same every time. The relationship between the position of the Z axis, which is a feed axis, and the phase of the main shaft is the same every time. That is, there is a pause until the phase of the main shaft reaches a predetermined thread-cutting start reference point at the thread-cutting start point. The thread-cutting start reference point is a predetermined phase of the main shaft and is a reference phase of the main shaft. The Z-axis position at the thread-cutting start point is the same every time.

To perform machining such that, with the main shaft being in an identical phase, the Z-axis coordinate of a cutting edge at the thread-cutting start point is different every time as in the "single edge cutting", a method in which, as just described, the Z-axis position at the thread-cutting start point is shifted while the phase of the main shaft is fixed so as to achieve an identical thread-cutting start reference point every time (a first method) and a method in which the phase of the main shaft is shifted at the start of the thread cutting while the Z-axis position at the thread-cutting start point is kept the same every time (a second method) are available. Machining of a workpiece is performed in the same manner in both of the methods. The (first method) and the (second method) will now be described in detail.

(First Method)

Figures 12, 13:
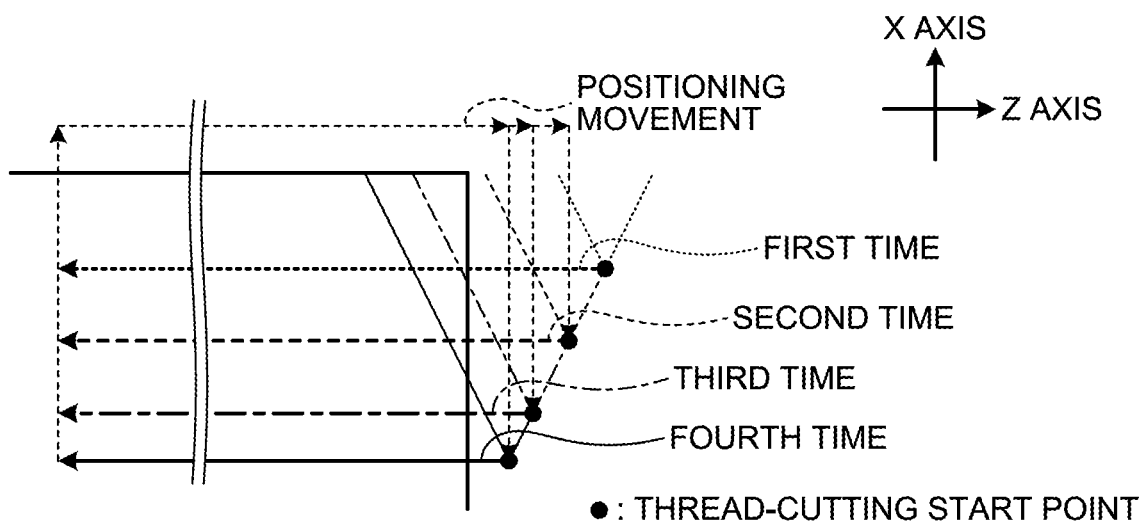
FIG. 12 is a diagram illustrating a track of a cutting edge point accomplished every time in a case in which the Z-axis coordinate of the cutting edge at the thread-cutting start point is different every time in the first embodiment.
FIG. 13 is a diagram illustrating an example of a machining program in a (first method) of the first embodiment.

FIG. 12 illustrates a track of a cutting edge point accomplished every time in the case of the "single edge cutting" in the (first method). In the (first method), the relationship between a distance from the start point of the feed-axis position and the main-shaft phase is the same every time. That is, there is a pause until the phase of the main shaft reaches the thread-cutting start reference point at the thread-cutting start point. The Z-axis position at the thread-cutting start point is different every time. The ratio of a feed-axis movement amount to a main-shaft rotation amount is the same every time.

Figures 14, 15:
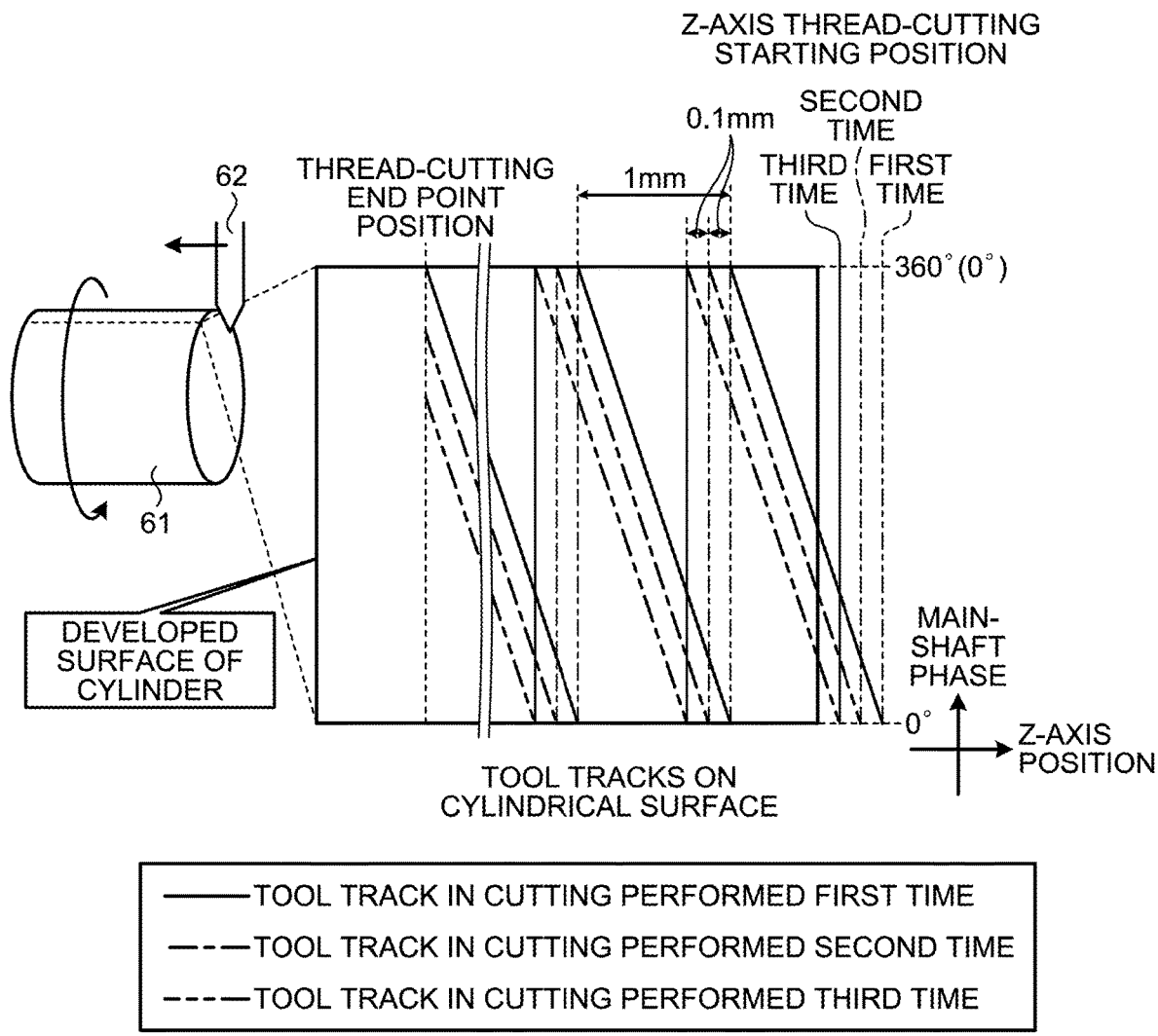
FIG. 14 is a diagram illustrating tool tracks in the (first method) on a cylindrical surface of a workpiece having its surface illustrated in a developed surface of the cylinder in the first embodiment.
FIG. 15 is a diagram illustrating an example of the machining program in a (second method) of the first embodiment.

FIG. 13 is a diagram illustrating an example of the machining program 432 in the (first method). FIG. 14 is a diagram illustrating tool tracks in the (first method) on a cylindrical surface of the workpiece 61 having its surface illustrated in a developed surface of the cylinder. As indicated by "Z10.0" in the second line, "Z9.9" in the fifth line, and the "Z9.8" in the ninth line of the machining program 432 in FIG. 13, the Z-axis position is different at the thread-cutting start point every time. The Z-axis position at the thread-cutting start point being different every time is also indicated by the Z-axis positions at the thread-cutting starting point in FIG. 14. As indicated by "Q0.0" in the third line, the seventh line, and the eleventh line of the machining program 432 in FIG. 13 and also in FIG. 14, the main-shaft phase has the same value at the start points of the thread cutting processes from the first time to the third time.

(Second Method)

In this method, the Z-axis position at the thread-cutting start point is the same every time. Thus, tracks of the cutting edge point are the same as those in FIG. 11. In contrast, the relationship between the feed-axis position and the phase of the main shaft is different every time. Specifically, the phase of the main shaft at the start of the thread cutting is shifted by a "thread-cutting start shift angle" that is a rotation amount of the main shaft corresponding to a Z-axis movement amount by which shifting is performed in the (first method) in FIG. 12. That is, the "thread-cutting start shift angle" is different every time. The ratio of a feed-axis movement amount to a main-shaft rotation amount is the same every time.

Figure 16:
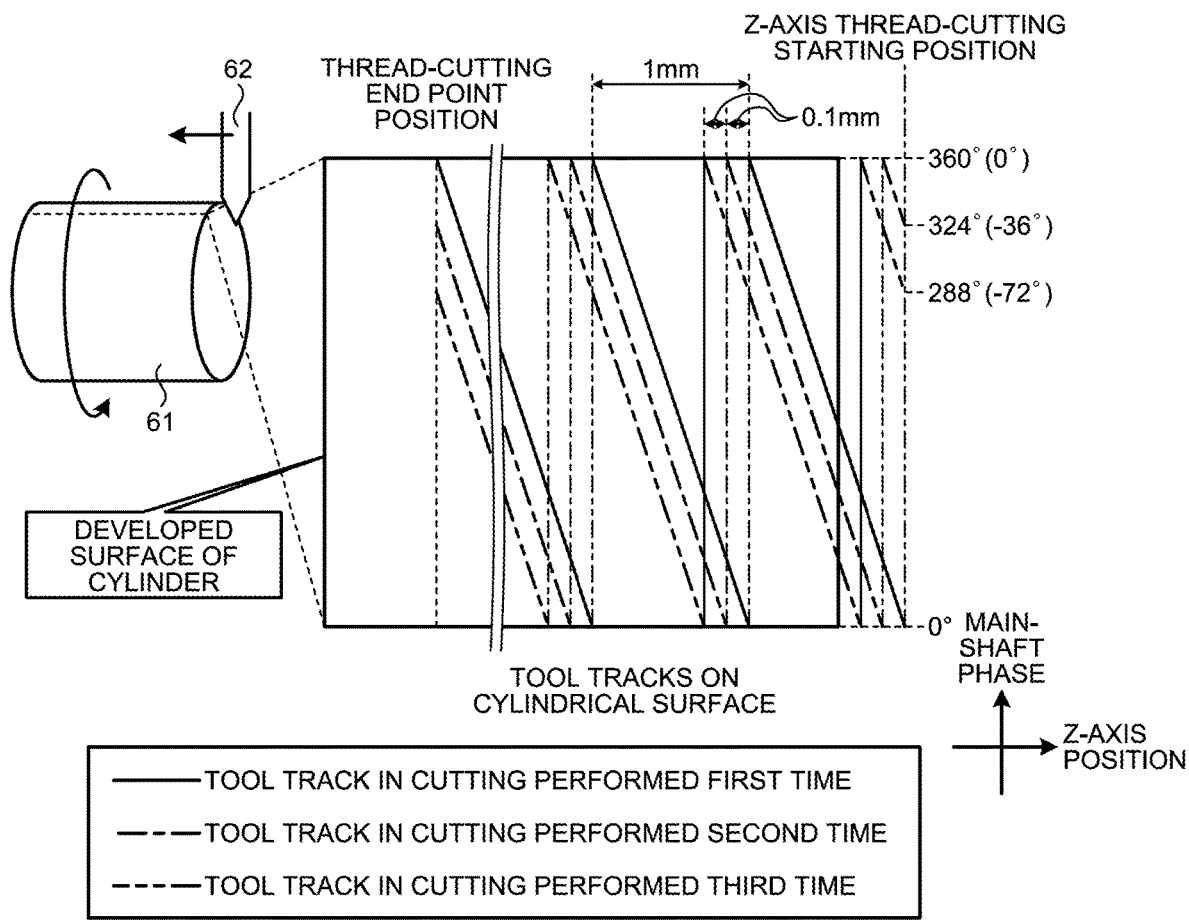
FIG. 16 is a diagram illustrating tool tracks in the (second method) on a cylindrical surface of a workpiece having its surface illustrated in a developed surface of the cylinder in the first embodiment.

FIG. 15 is a diagram illustrating an example of the machining program 432 in the (second method). FIG. 16 is a diagram illustrating tool tracks in the (second method) on a cylindrical surface of the workpiece 61 having its surface illustrated in a developed surface of the cylinder. As indicated by "Z10.0" in the second line, "Z10.0" in the fifth line, and "Z10.0" in the ninth line of the machining program 432 in FIG. 15, the Z-axis position is the same at the thread-cutting start point every time. The Z-axis position at the thread-cutting start point being the same every time is also indicated by the Z-axis thread-cutting starting position in FIG. 16. As indicated by "Q0.0" in the third line, "Q324.0" in the seventh line, and "Q288.0" in the eleventh line of the machining program 432 in FIG. 15, the main-shaft phase at the start points of the thread cutting processes from the first time to the third time is designated so as to be shifted by the rotation amount of the main shaft corresponding to the Z-axis movement amount by which shifting is performed in FIG. 14, in other words, by the "thread-cutting start shift angle". Accordingly, as indicated in FIG. 16, the main-shaft phase at the start points of the thread cutting processes from the first time to the third time is 360° (=0°) in the first time, 324° (=−36°) in the second time, and 288° (=−72°) in the third time, thus providing evenly spaced shifting corresponding to the Z-axis movement amount by which shifting is performed in FIG. 14.

The (first method) and the (second method) described above are also applicable to the "modified single edge cutting" and the "staggered cutting". This concludes the description of the thread cutting process involving no vibration.

Figure 17:
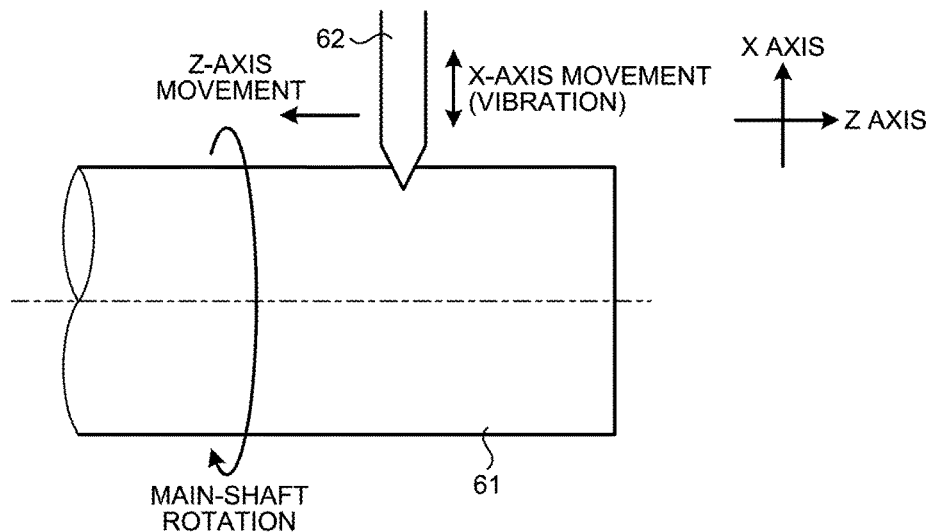
FIG. 17 is a diagram for describing superimposition of vibration being performed in a thread cutting process in the first embodiment.

A thread cutting process involving superimposition of a low frequency vibration will now be described. FIG. 17 is a diagram for describing the superimposition of vibration in the X-axis direction being performed in a thread cutting process. As illustrated in FIG. 17, vibration that is a reciprocating feed movement in the X-axis direction, which is a perpendicular direction to the lead direction, is superimposed on an operation in the Z-axis direction, which is the lead direction of the tool 62, in a thread cutting process operation. The superimposition of the vibration in the X-axis direction is performed with a vibration unit, such as the vibration movement amount calculation unit 482 and the movement amount superimposition unit 483. In the case in which thread grooves having evenly spaced thread pitches are formed, each of the rotational speed of the main shaft and the moving speed in the Z-axis direction is a constant speed in the description below. That is, the rotational speed of the main shaft and the moving speed in the Z-axis direction keep a predetermined speed ratio.

Figure 18:
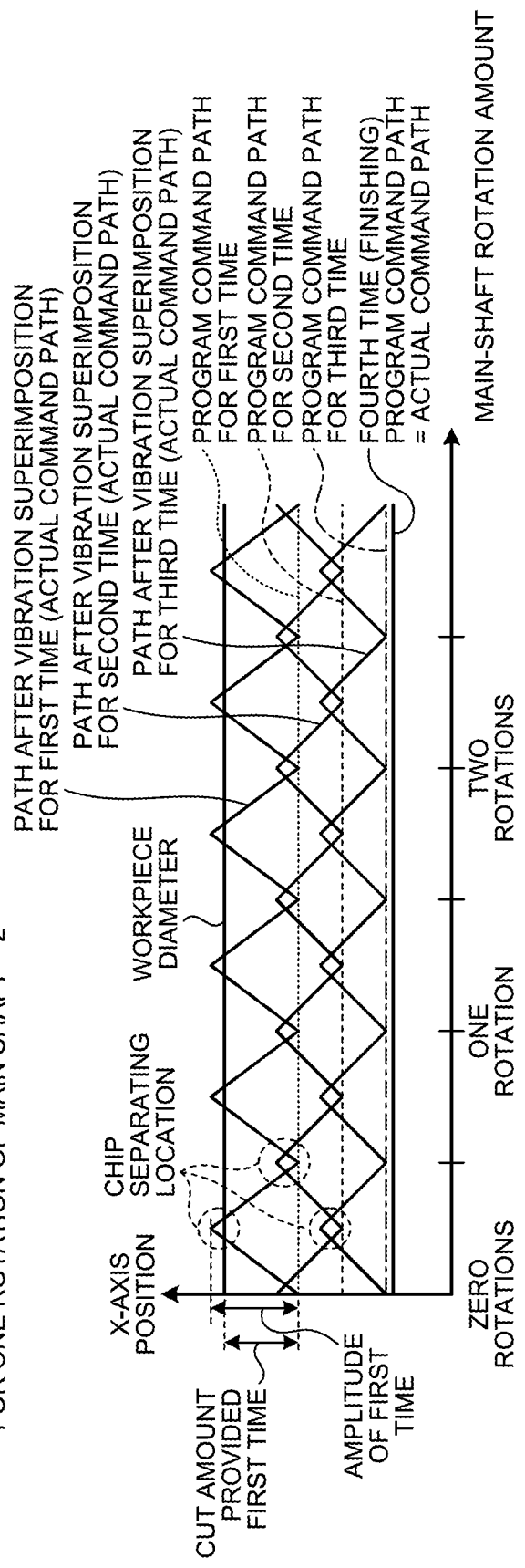
FIG. 18 is a diagram illustrating an example operation of a low-frequency vibration thread cutting process under a vibration condition that the number of times vibration is provided for one rotation of the main shaft is two in the first embodiment.

FIG. 18 is a diagram illustrating an example operation of a low-frequency vibration thread cutting process under a vibration condition that the number of times vibration is provided for one rotation of the main shaft is two. In FIG. 18, the horizontal axis represents the main-shaft rotation amount, and the longitudinal axis represents the X-axis position. As illustrated in FIG. 18, vibration in the X-axis direction is superimposed on a program command path. That is, the vibration is superimposed in a direction away from the workpiece 61. Specifically, control is performed such that the superimposition of the vibration does not cause the workpiece 61 to be cut deeper than the program command path. In FIG. 18, a thread cutting process performed the first time to a thread cutting process performed the third time are low-frequency vibration thread cutting processes, and a thread cutting process performed the fourth time is a finishing process involving no vibration.

Furthermore, the amplitude of the vibration is greater than a cut amount in an actual command path used each time.

FIG. 18 illustrates that the peak of vibration provided in the thread cutting process performed the first time exceeds the workpiece diameter and that the amplitude of the thread cutting process performed the first time is greater than the cut amount of the thread cutting process performed the first time. In addition, by shifting the phase of vibration provided each time from the phase of vibration provided the immediately preceding time by a vibration phase shift amount with respect to the phase indicated by the rotation amount of the main shaft, chips can be separated. FIG. 18 illustrates that the vibration phase shift amount=180° and that the vibration phase is shifted by 180° every time. The vibration phase shift amount is not limited to 180°. A vibration phase shift amount may be assigned with the parameter 431, or the thread-cutting vibration adjustment unit 484 may retain a vibration phase shift amount. Alternatively, the machining program 432 may designate a vibration phase shift amount as described hereinafter.

Figure 19:
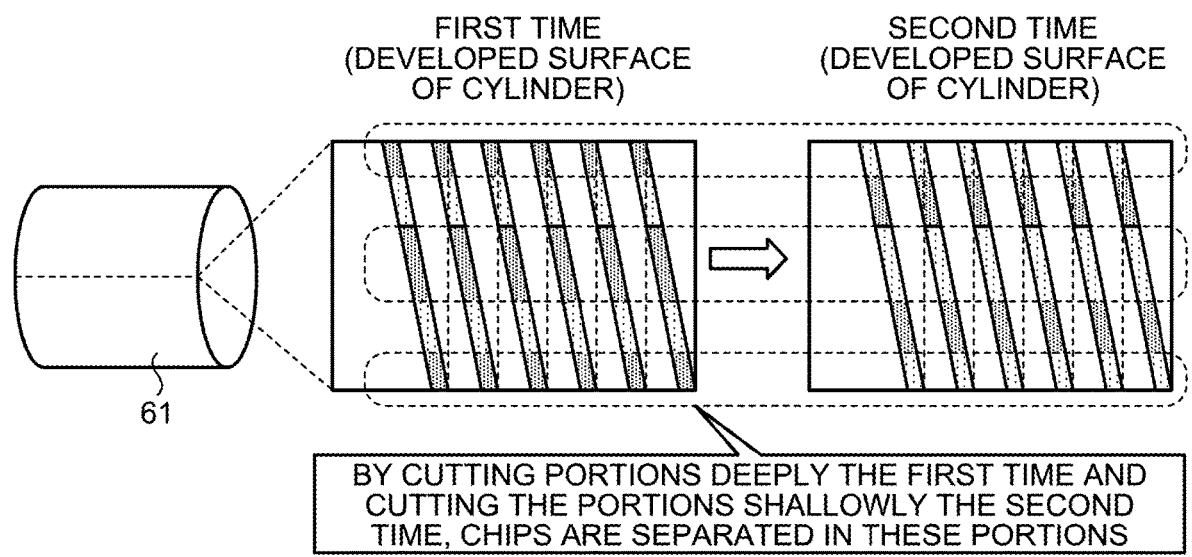
FIG. 19 is a diagram illustrating, by shading, the depths of cuts provided the first time and the second time when the phase is shifted by 180° every time as in FIG. 18 in the first embodiment.

FIG. 19 is a diagram illustrating, by shading, the depths of cuts provided the first time and the second time when the phase of vibration is shifted by 180° every time as in FIG. 18. Darker portions represent portions cut deeply, and lighter portions represent portions cut shallowly. As illustrated in FIG. 19, by cutting portions deeply the first time and cutting the portions shallowly the second time, chips can be separated in portions marked with dotted lines in cut regions, and thus, an advantage of vibration cutting can be obtained. Accordingly, in a low-frequency vibration thread cutting process, by controlling the phase of the main shaft and the phase of vibration each time cutting is performed such that the phase of the main shaft and the phase of vibration have a relationship as designated, such as the phase of vibration provided every time is shifted by 180°, an advantage of separating chips in the vibration cutting can be obtained. During the finishing process performed the fourth time illustrated in FIG. 18, a finish surface is machined accurately by performing a thread cutting operation in which a program command path is used as it is such that the program command path serves as an actual command path and no vibration is superimposed.

Figure 20:
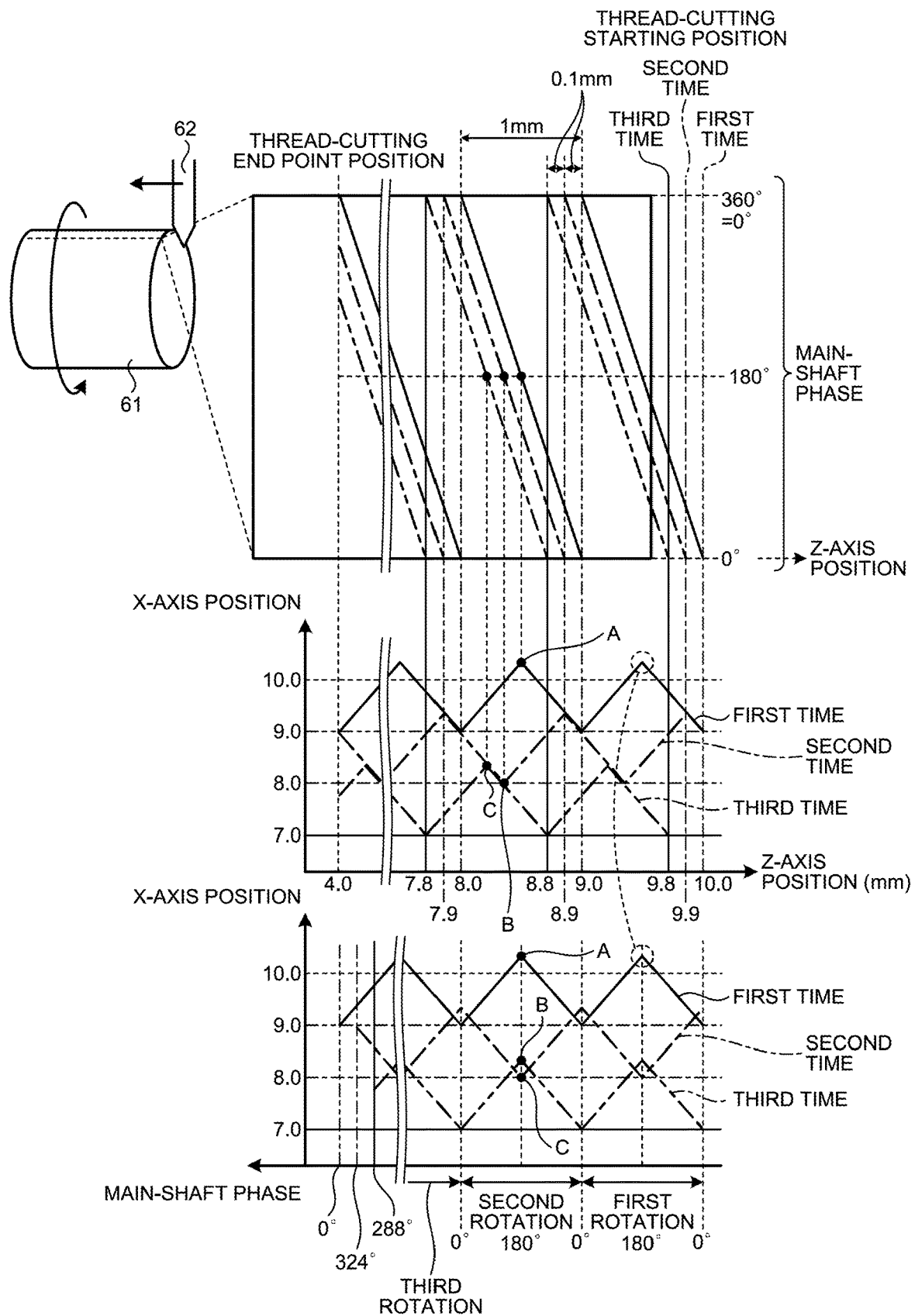
FIG. 20 is a diagram illustrating tool tracks in a top portion, the relationship between a Z-axis position, which is a lead-axis position, and an X-axis position in a middle portion, and the relationship between a main-shaft phase and the X-axis position in a bottom portion in a case in which a low frequency vibration is superimposed in the (first method) in the first embodiment.

A specific example of a thread cutting process of the (first method) in which a low frequency vibration is superimposed with the phase of the vibration at the start of vibration shifted by 180° every time will now be described. The machining program 432 used when the low frequency vibration is superimposed in the (first method) is similar to that in FIG. 13, although a condition for the low frequency vibration is assigned separately from the machining program 432 in FIG. 13. In this example, the number of times vibration is provided for one rotation of the main shaft is one, that is, there is a relationship in which the time taken for one rotation of the main shaft is one period of vibration. FIG. 20 is a diagram illustrating, from the top, tool tracks on a cylindrical surface of the workpiece 61 having its surface illustrated in a developed surface of the cylinder in a top portion of the diagram, the relationship between the Z-axis position, which is the lead-axis position, and the X-axis position in a middle portion of the diagram, and the relationship between the main-shaft phase and the X-axis position in a bottom portion of the diagram in the case in which the low frequency vibration is superimposed in the (first method). The tool tracks on the cylindrical surface are illustrated with the horizontal axis representing the Z-axis position and the longitudinal axis representing the phase of the main shaft.

As indicated by "Z10.0" in the second line, "Z9.9" in the fifth line, and "Z9.8" in the ninth line of the machining program 432 in FIG. 13, the Z-axis position at the thread-cutting start point is different every time. The Z-axis position at the thread-cutting starting point being shifted by 0.1 mm to be different every time is also indicated by the Z-axis positions at the thread-cutting starting point in the tool tracks of FIG. 20. As indicated by "Q0.0" in the third line, the seventh line, and the eleventh line of the machining program 432 in FIG. 13 and also in FIG. 20, the main-shaft phase has the same value at the starting points of the thread cutting processes from the first time to the third time. In this case, the phase of vibration at the starting point in a thread cutting process is shifted by 180° every time.

As indicated by the relationship between the Z-axis position and the X-axis position illustrated in the middle portion of FIG. 20, the relationship between the Z-axis phase and the vibration phase indicated by the X-axis position is not a relationship in which a shift is made by 180° every time. In contrast, it is obvious, from the vibration phases indicated by the X-axis positions of a point A, a point B, and a point C illustrated in the middle portion of FIG. 20 that correspond to the thread cutting processes from the first time to the third time performed when the main-shaft phase is, for example, 180° in the tool tracks in the top portion of FIG. 20, that the vibration phase accomplished every time is shifted by 180° when the main-shaft phase is identical in the thread cutting processes from the first time to the third time. That is, as indicated by the relationship between the main-shaft phase and the X-axis position in the bottom portion of FIG. 20, there is a relationship in which the vibration phase is shifted by 180° every time. As described above, in the (first method), the relationship in which the vibration phase of the vibration provided every time is shifted by 180° with respect to an identical main-shaft phase is obtained by shifting the phase of vibration by 180° at the thread-cutting starting point every time.

Figure 21:
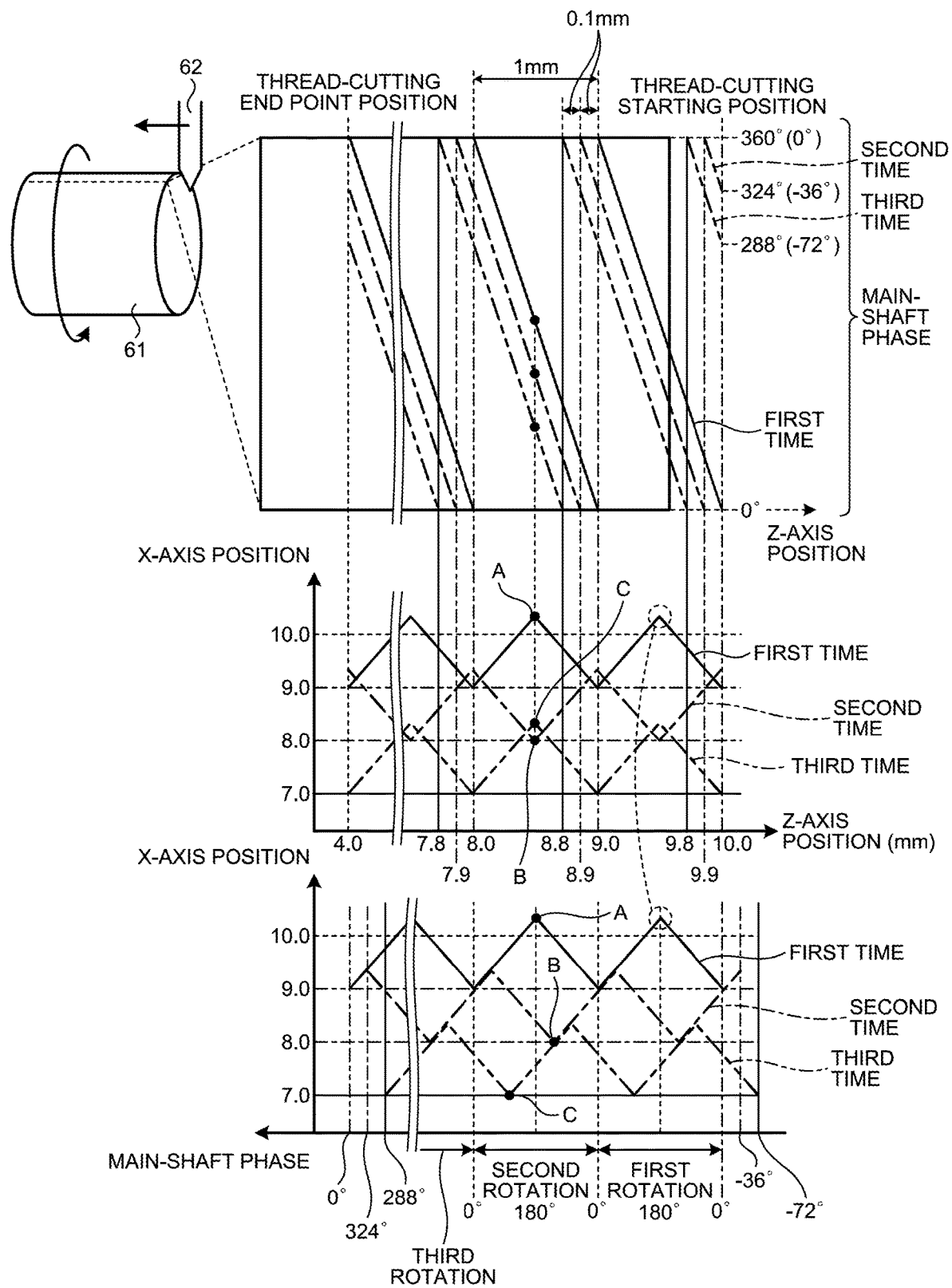
FIG. 21 is a diagram illustrating tool tracks in a top portion, the relationship between the Z-axis position, which is the lead-axis position, and the X-axis position in a middle portion, and the relationship between the main-shaft phase and the X-axis position in a case in which a low frequency vibration is superimposed in the (second method) in the first embodiment.

A specific example of a thread cutting process of the (second method) in which a low frequency vibration is superimposed with the phase of the vibration at the start of vibration shifted by 180° every time, as in the case with the (first method), will now be described. The machining program 432 used when the low frequency vibration is superimposed in the (second method) is similar to that in FIG. 15, although a condition for the low frequency vibration is assigned separately from the machining program 432 in FIG. 15. In this example, the number of times vibration is provided for one rotation of the main shaft is also one, that is, there is a relationship in which the time taken for one rotation of the main shaft is one period of vibration. FIG. 21 is a diagram illustrating, from the top, tool tracks on a cylindrical surface of the workpiece 61 having its surface illustrated in a developed surface of the cylinder in a top portion of the diagram, the relationship between the Z-axis position, which is the lead-axis position, and the X-axis position in a middle portion of the diagram, and the relationship between the main-shaft phase and the X-axis position in a bottom portion of the diagram in the case in which the low frequency vibration is superimposed in the (second method). The tool tracks on the cylindrical surface are illustrated with the horizontal axis representing the Z-axis position and the longitudinal axis representing the phase of the main shaft.

As indicated by "Z10.0" in the second line, the fifth line, and the ninth line of the machining program 432 in FIG. 15, the Z-axis position at the thread-cutting start point is the same every time. This is also indicated by the Z-axis position at the thread-cutting starting point in the tool tracks of FIG. 21. In contrast, as indicated by "Q0.0" in the third line, "Q324.0" in the seventh line, and "Q288.0" in the eleventh line of the machining program 432 in FIG. 15 and also by FIG. 21, the main-shaft phase at the starting point of thread cutting processes from the first time to the third time is shifted by the rotation amount of the main shaft corresponding to the Z-axis movement amount in the (first method), that is, by the "thread-cutting start shift angle" to be different every time. In the case of FIG. 21, the phase of vibration at the thread-cutting starting point is shifted by 180° every time.

In the relationship between the Z-axis position and the X-axis position illustrated in the middle portion of FIG. 21, as indicated by the vibration phases indicated by the X-axis positions of a point A, a point B, and a point C at the same Z-axis position, the relationship between the Z-axis position and the vibration phase indicated by the X-axis position is a relationship in which a shift is made by 180° every time. In contrast, as indicated by the relationship between the main-shaft phase and the X-axis position illustrated in the bottom portion of FIG. 21, there is no relationship in which the vibration phase is shifted by 180° every time. That is, by merely shifting the phase of vibration at the thread-cutting starting point by 180° every time, the relationship in which the vibration phase of the vibration provided every time is shifted by 180° with respect to an identical main-shaft phase is not obtained.

Hence, in the thread cutting process in the (second method), the vibration phase at the start of vibration is shifted by an amount corresponding to a shifting amount of a "thread-cutting start shift angle" in advance, and then, the low frequency vibration is superimposed with the phase of vibration at the start of vibration shifted by 180° every time. The machining program 432 used when the low frequency vibration is superimposed is similar to that in FIG. 15, although a condition for the low frequency vibration is assigned separately from the machining program 432 in FIG. 15.

In this example, the number of times vibration is provided for one rotation of the main shaft is also one, that is, there is a relationship in which the time taken for one rotation of the main shaft is one period of vibration. The rotation of the main shaft and the vibration have such a predetermined relationship, and thus, shifting the vibration phase at the start of vibration by an amount corresponding to the shifting amount of the "thread-cutting start shift angle" in advance corresponds to shifting the X-axis position by a vibration phase amount corresponding to the "thread-cutting start shift angle", which is a phase shift amount of the main shaft.

Specifically, a "thread-cutting start shift angle" designated in the machining program 432 is read by the vibration-command analysis unit 452 and stored in the shared area 434. The thread-cutting vibration adjustment unit 484 causes the drive unit 10 to adjust the vibration phase, that is, the X-axis position, at the start of vibration on the basis of the "thread-cutting start shift angle" stored in the shared area 434.

Figure 22:
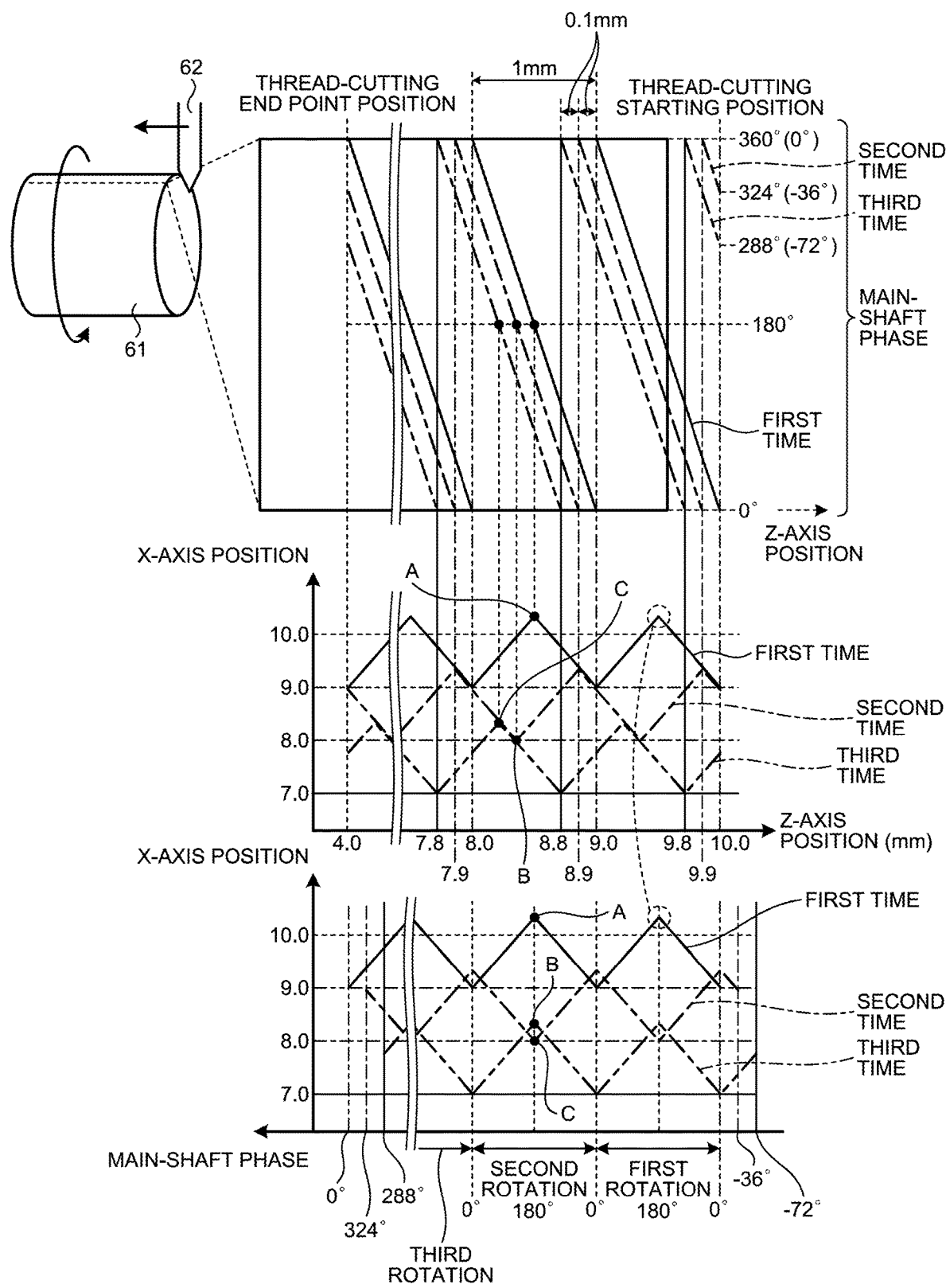
FIG. 22 is a diagram illustrating tool tracks in a top portion, the relationship between the Z-axis position, which is the lead-axis position, and the X-axis position in a middle portion, and the relationship between the main-shaft phase and the X-axis position in a bottom portion in a case in which a vibration phase at start of vibration is shifted by an amount corresponding to a shifting amount of a "thread-cutting start shift angle" and then a low frequency vibration is superimposed in the (second method) in the first embodiment.

FIG. 22 is a diagram illustrating, from the top, tool tracks on a cylindrical surface of the workpiece 61 having its surface illustrated in a developed surface of the cylinder in a top portion of the diagram, the relationship between the Z-axis position, which is the lead-axis position, and the X-axis position in a middle portion of the diagram, and the relationship between the main-shaft phase and the X-axis position in a bottom portion of the diagram in the case in which the vibration phase at the start of vibration is shifted by an amount corresponding to the shifting amount of the "thread-cutting start shift angle" and then the low frequency vibration is superimposed in the (second method). The tool tracks on the cylindrical surface are illustrated with the horizontal axis representing the Z-axis position and the longitudinal axis representing the phase of the main shaft.

In this example, as illustrated in the middle portion of FIG. 22, the X-axis position is shifted by a vibration phase amount corresponding to the "thread-cutting start shift angle" at the start of vibration every time. Accordingly, there is a relationship in which the vibration phases indicated by the X-axis positions of a point A, a point B, and a point C illustrated in the middle portion of FIG. 22 that correspond to the thread cutting processes from the first time to the third time performed when the main-shaft phase is, for example, 180° in the tool tracks in FIG. 22 are shifted by 180° every time. That is, as indicated by the relationship between the main-shaft phase and the X-axis position in the bottom portion of FIG. 22, there is the relationship in which the vibration phase is shifted by 180° every time. As described above, in the (second method), the relationship in which the vibration phase of the vibration provided every time is shifted by 180° with respect to an identical main-shaft phase is obtained by shifting the X-axis position by a vibration phase amount corresponding to a "thread-cutting start shift angle" and then shifting the phase of vibration by 180° at the thread-cutting starting point every time.

In a low-frequency vibration thread cutting process, the numerical control apparatus 1 according to the first embodiment can adjust the phase of vibration appropriately each time a cut process, to be performed more than once, is performed by controlling the phase of vibration with respect to the phase of the main shaft, as described with FIG. 20 and FIG. 22. This produces an effect of separating chips in the thread cutting process.

In second and third embodiments to be described below, two methods will be described in detail in which, in a thread cutting process involving superimposition of vibration having a period having a predetermined ratio with a rotation period of the main shaft, the numerical control apparatus 1 can adjust the phase of vibration and the timing to start vibrating as described above with consideration given to the "thread-cutting start shift angle", which determines the timing to start moving in a thread lead axis direction and a designated phase shift amount that is a shifting amount of the vibration phase accomplished each time a thread cutting process is performed.

Second Embodiment

Figure 23:
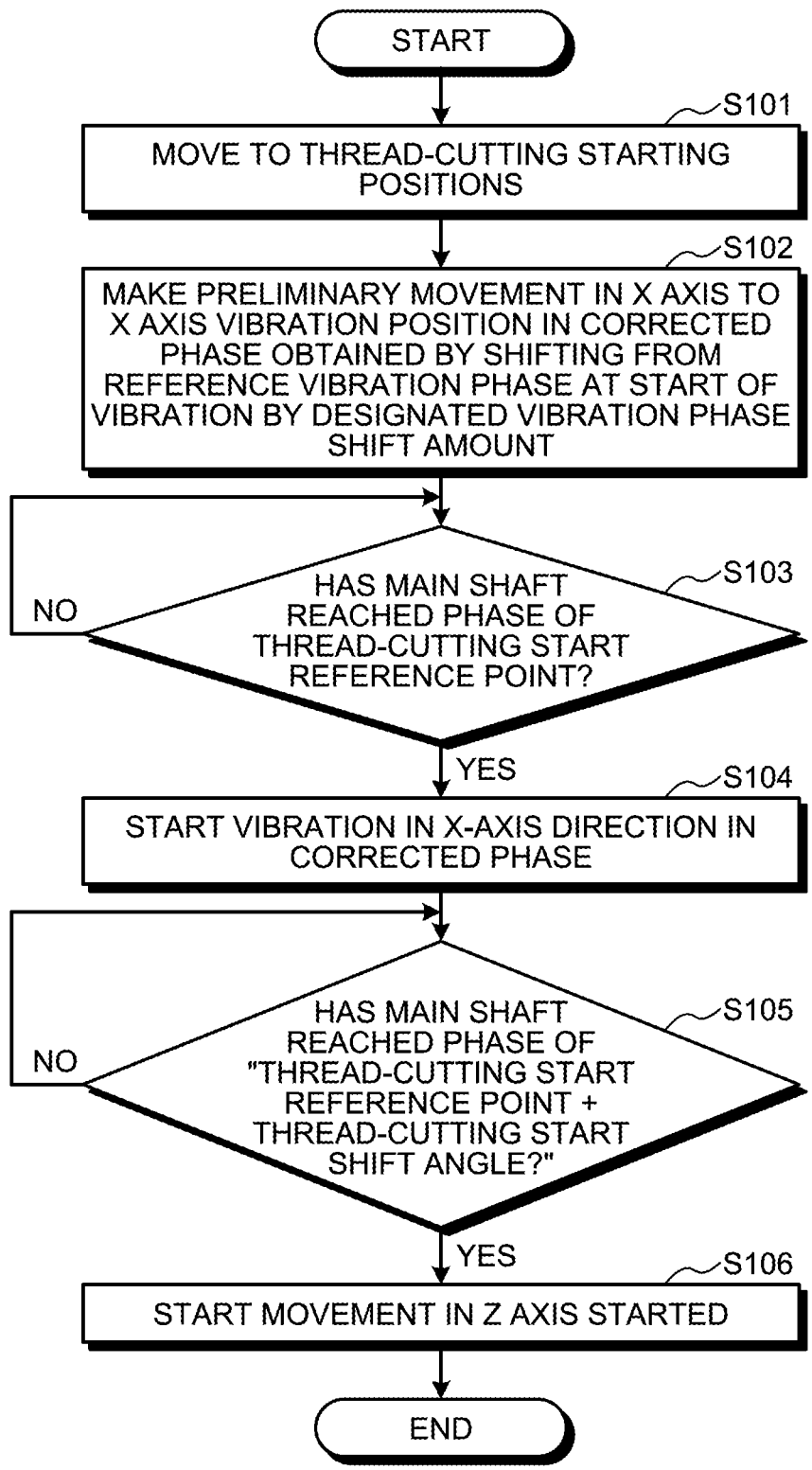
FIG. 23 is a flowchart illustrating an operation of a low-frequency vibration thread cutting process by the numerical control apparatus according to the second embodiment.

FIG. 23 is a flowchart illustrating an operation of a low-frequency vibration thread cutting process by the numerical control apparatus 1 according to a second embodiment. The configuration of the numerical control apparatus 1 is illustrated in FIG. 1 described in the first embodiment. In the second embodiment, a preliminary movement in the X axis corresponding to a designated phase shift amount of vibration is made.

Specifically, in step S101 in FIG. 23, the drive unit 10 causes movements to thread-cutting starting positions in the X axis and the Z axis. Then, the thread-cutting vibration adjustment unit 484 causes the drive unit 10 to enable a preliminary movement in the X-axis direction to a vibration position in a "corrected phase" that is obtained by shifting from a reference vibration phase at the start of vibration by a designated vibration phase shift amount (step S102). The phase shift amount of vibration is a predetermined value, and it is 180° here. When the phase shift amount of vibration is 180°, the "corrected phase" is also 180°. The "corrected phase" is obtained by subtracting the phase shift amount of vibration from 360°. In this case, the "corrected phase" is obtained with 360°−180°=180°.

After step S102, the thread-cutting vibration adjustment unit 484 determines in step S103 whether the main shaft has reached the phase of the thread-cutting start reference point. Step S103 is repeated until the main shaft reaches the phase of the thread-cutting start reference point (step S103: No). At a point in time when the main shaft reaches the phase of the thread-cutting start reference point (step S103: Yes), the thread-cutting vibration adjustment unit 484 controls the drive unit 10 such that vibration in the X-axis direction is started (step S104). The vibration phase in which the vibration in the X axis is started in step S104 is the phase corresponding to the preliminary movement in step S102, that is, the "corrected phase".

After step S104, the thread-cutting vibration adjustment unit 484 determines in step S105 whether the main shaft has reached the phase of a "thread-cutting start reference point+thread-cutting start shift angle". Step S105 is repeated until the main shaft reaches the phase of the "thread-cutting start reference point+thread-cutting start shift angle" (step S105: No). At a point in time when the main shaft reaches the phase of the "thread-cutting start reference point+thread-cutting start shift angle" (step S105: Yes), the interpolation processing unit 48 controls the drive unit 10 such that movement in the Z axis is started (step S106). When the thread-cutting start shift angle is 0°, step S104 and step S106 are started simultaneously.

The flowchart in FIG. 23 will be described by using a specific example below. While the flowchart in FIG. 23 is performed in a thread cutting process every time, a thread cutting process performed the second time will be mainly used in the description below to facilitate understanding. The flowchart in FIG. 23, which represents an operation with which all of the main shaft, the X axis, and the Z axis are associated, will be described in each of example operations below by using a "diagram illustrating the relationship between the main-shaft phase and the X-axis position" and a "diagram illustrating the relationship between the Z-axis position and the X-axis position".

(Example Operation 1-1)

FIG. 24 is a diagram illustrating a vibration condition for an example operation 1-1 in the second embodiment. The example operation 1-1 is a case in which the thread-cutting starting position in the Z axis is the same in thread cutting processes performed the first time and the second time and the "thread-cutting start shift angle" is the same at 0° in the thread cutting processes performed the first time and the second time.

FIG. 25 is a diagram illustrating the relationship between the main-shaft phase and the X-axis position of the example operation 1-1 in the second embodiment. In the thread cutting process performed the second time, after movement is made to an undepicted thread-cutting starting position in step S101, a preliminary movement in the X axis, which is not shown in FIG. 25, is completed (step S102) at (1) in FIG. 25. Subsequently, at (2) in FIG. 25, which is at the point in time when the main shaft reaches the phase of the thread-cutting start reference point (step S103: Yes), vibration is started with the phase of vibration at the thread-cutting starting point shifted by the "corrected phase"=180° (step S104); then, the relationship is obtained in which the vibration phase of the vibration indicated by the X-axis position with respect to an identical main-shaft phase is shifted between the thread cutting process performed the first time and the thread cutting process performed the second time by 180°, which is the phase shift amount of vibration, as illustrated.

FIG. 26 is a diagram illustrating the relationship between the Z-axis position and the X-axis position of the example operation 1-1 in the second embodiment. In the thread cutting process performed the second time, the movement to the thread-cutting starting position is made until A in FIG. 26 (step S101), and the preliminary movement in the X axis is made at B in FIG. 26 (step S102). Then, there is a pause until the main shaft reaches the thread-cutting start reference point at C in FIG. 26, and at a point in time when the main shaft reaches the thread-cutting start reference point (step S103: Yes), vibration in the X-axis direction is started in the "corrected phase" (step S104). Since the "thread-cutting start shift angle" used in the second time is 0° in the example operation 1-1, step S105 accomplishes "Yes" at a point in time when the main shaft reaches the thread-cutting start reference point at C in FIG. 26 (step S103: Yes), and thus, when the vibration in the X-axis direction is started in step S104, movement in the Z axis is started (step S106) simultaneously.

A location indicated with "first time (2)" in FIG. 26 corresponds to when the main-shaft phase accomplishes (2) in the thread cutting process performed the first time in FIG. 25, which illustrates the relationship between the main-shaft phase and the X-axis position of the example operation 1-1. That is, when the vibration in the X-axis direction is started (step S104), the movement in the Z-axis direction is started (step S106) simultaneously at "first time (2)" in FIG. 26 in the thread cutting process performed the first time. Similarly, a location indicated with "second time (1), (2)" in FIG. 26 corresponds to when the main-shaft phase accomplishes (1) and (2) in the thread cutting process performed the second time in FIG. 25. That is, in the thread cutting process performed the second time, the vibration in the X-axis direction is not started and there is a pause until the main shaft reaches the thread-cutting start reference point at C in FIG. 26 while the main-shaft phase changes from (1) to (2) in FIG. 25 after the preliminary movement is completed in step S102. In a "diagram illustrating the relationship between the Z-axis position and the X-axis position" corresponding to a "diagram illustrating the relationship between the main-shaft phase and the X-axis position" illustrated below for each of example operations, similar notation indicates correspondence with the position of the main-shaft phase for each of thread cutting processes.

Example Operation 1-2

FIG. 27 is a diagram illustrating a vibration condition for an example operation 1-2 in the second embodiment. The example operation 1-2 is a case in which the thread-cutting starting position in the Z axis is different for each of the thread cutting processes performed the first time and the second time and the "thread-cutting start shift angle" is the same at 0° in the thread cutting processes performed the first time and the second time. The example operation 1-2 is an operation similar to that in FIG. 20. The relationship between the main-shaft phase and the X-axis position of the example operation 1-2 is similar to that in FIG. 25.

FIG. 28 is a diagram illustrating the relationship between the Z-axis position and the X-axis position of the example operation 1-2 in the second embodiment. In the thread cutting performed the second time, movement is made to the thread-cutting starting position at A in FIG. 28, which is a thread-cutting starting point different from the thread-cutting starting point used the first time (step S101), and the preliminary movement is made in the X axis at B in FIG. 28 (step S102). Subsequently, there is a pause until the main shaft reaches the thread-cutting start reference point at C in FIG. 28, and at a point in time when the main shaft reaches the thread-cutting start reference point (step S103: Yes), the vibration in the X-axis direction is started in the "corrected phase" (step S104). Since the "thread-cutting start shift angle" used the second time is also 0° in the example operation 1-2, step S105 accomplishes "Yes" at the point in time when the main shaft reaches the thread-cutting start reference point at C in FIG. 28 (step S103: Yes); thus, when the vibration in the X-axis direction is started in step S104, movement in the Z axis is started (step S106) simultaneously.

Example Operation 1-3

FIG. 29 is a diagram illustrating a vibration condition for an example operation 1-3 in the second embodiment. The example operation 1-3 is a case in which the thread-cutting starting position in the Z axis is the same in thread cutting processes performed the first time and the second time and the "thread-cutting start shift angle" is different for each of the thread cutting processes performed the first time and the second time. The example operation 1-3 is an operation similar to that in FIG. 22.

Figure 30:
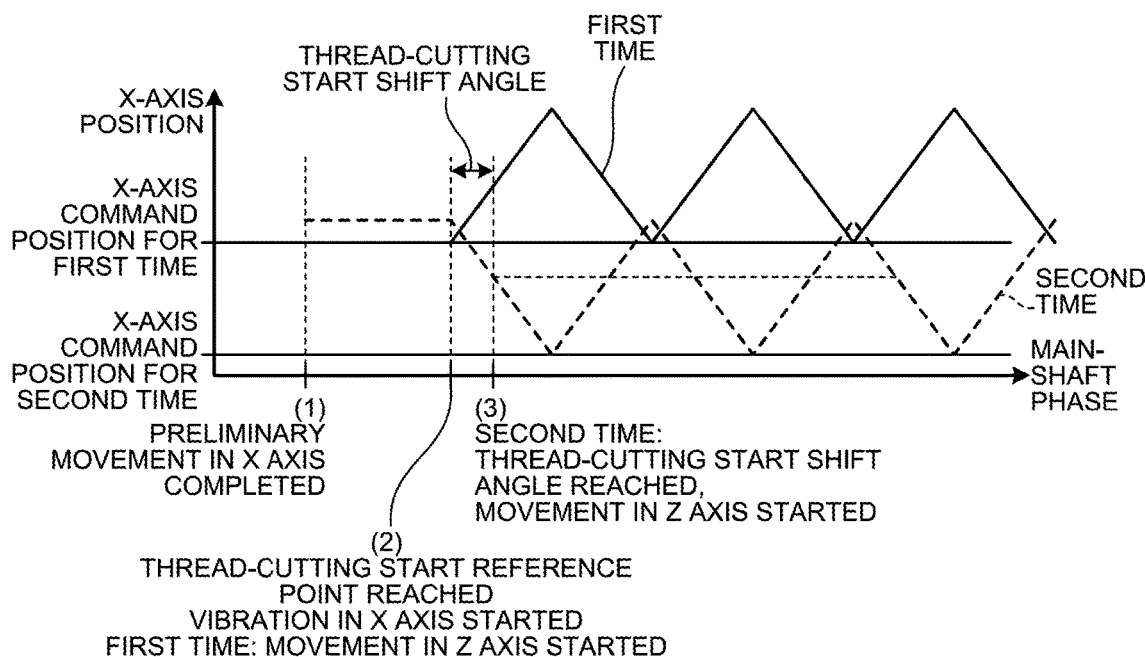
FIG. 30 is a diagram illustrating the relationship between the main-shaft phase and the X-axis position of the example operation 1-3 and an example operation 1-4 in the second embodiment.

FIG. 30 is a diagram illustrating the relationship between the main-shaft phase and the X-axis position of the example operation 1-3 in the second embodiment. In the thread cutting process performed the second time, a preliminary movement in the X-axis direction is completed at (1) in FIG. 30 (step S102), the main shaft reaches the phase of the thread-cutting start reference point (step S103: Yes) and, thus, vibration is started with the phase of the vibration shifted to the "corrected phase"=180° (step S104) at (2) in FIG. 30, and, after rotation of the main shaft by the "thread-cutting start shift angle" (step S105: Yes) is awaited, movement in the Z axis is started at (3) in FIG. 30 (step S106). This indicates that the relationship in which the vibration phase of the vibration indicated by the X-axis position is shifted by 180° with respect to an identical main-shaft phase is obtained.

Figure 31:
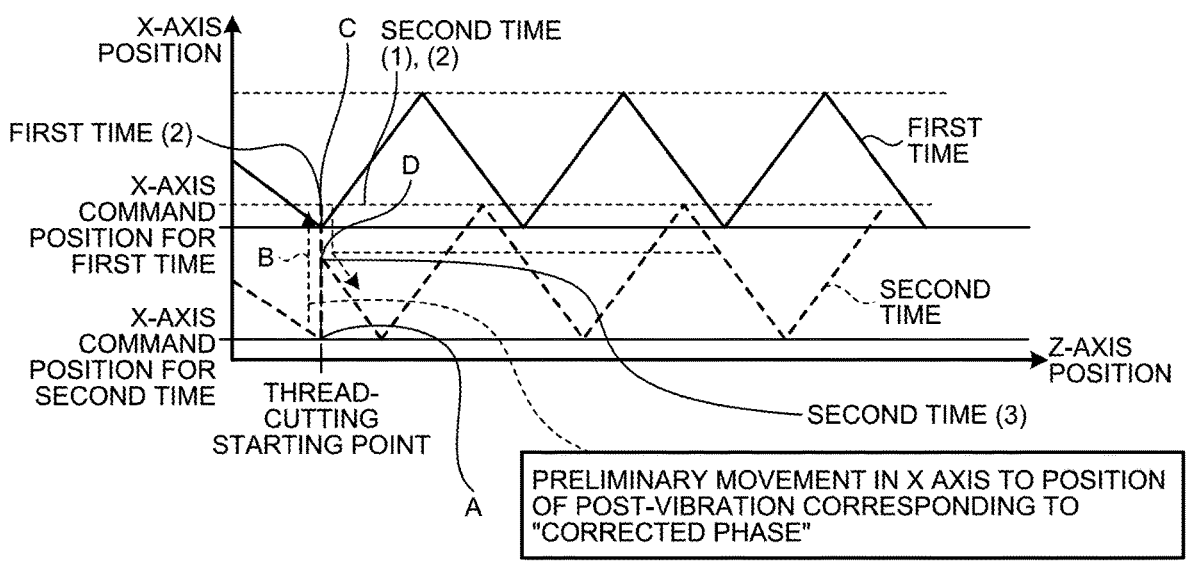
FIG. 31 is a diagram illustrating the relationship between the Z-axis position and the X-axis position of the example operation 1-3 in the second embodiment.

FIG. 31 is a diagram illustrating the relationship between the Z-axis position and the X-axis position of the example operation 1-3 in the second embodiment. In the thread cutting process performed the second time, movement to the thread-cutting starting position that is the same Z-axis position as the first time is made until A in FIG. 31 (step S101), and the preliminary movement in the X axis is made at B in FIG. 31 (step S102). At the point in time when the main shaft reaches the thread-cutting start reference point at C in FIG. 31 (step S103: Yes), the vibration in the X-axis direction is started in the "corrected phase" (step S104). Then, at the point in time when the main shaft reaches the designated thread-cutting start shift angle (step S105: Yes) at D in FIG. 31, the movement in the Z axis is started (step S106).

A detailed example of the machining program 432 of the example operation 1-3, in which the thread-cutting starting position in the Z axis is the same every time and the "thread-cutting start shift angle" is different every time, is illustrated in FIG. 32. In the machining program 432 illustrated in FIG. 32, the number of times cutting is performed is four in total, where the cutting performed the first time to the third time entails low-frequency vibration thread cutting processes, and the cutting performed the fourth time is a finishing process involving no vibration. As indicated by "Z100.0" in each of blocks for "N10", "N20", "N30", and "N40" in FIG. 32, the thread-cutting starting position in the Z axis is the same every time. In contrast, as indicated by "Q0.0" in "N11", "Q325.584" in "N22", "Q299.088" in "N32", and "Q297.648" in "N42" in FIG. 32, commands are issued such that the "thread-cutting start shift angle" is different every time. A movement command for the X axis is a diameter-value command, which, when issued for, for example, 1 mm, causes movement of 0.5 mm, which is a half of the command, in the X axis, and a movement command for the Z axis is a radius-value command, which, when issued for, for example, 1 mm, causes movement of 1 mm, which is as the command is, in the Z axis.

A machining condition for use when the machining program 432 in FIG. 32 is executed is described below.

As designated in an X address of a G165 command in an "N03" block, a workpiece diameter is 10 mm. A tool cutting edge angle is 60°. The height of a thread ridge, i.e., the depth of cutting, is 1.75 mm.

Default settings for the vibration phase shift amounts for use in a vibration thread-cutting mode in accordance with the "G165 P3" command in the "N03" block are 0° for cutting to be performed an odd number of times and 180° for cutting to be performed an even number of times. That is, the vibration phase shift amount to be used the first time and the third time is 0°, and the vibration phase shift amount to be used the second time is 180°. In this example, the number of times vibration is provided for one rotation of the main shaft is two.

The amplitude of vibration is determined in a manner described below from the workpiece diameter designated in the X address of the G165 command in the "N03" block, a "cut-amount amplitude ratio" designated in the Q address, and the thread-cutting starting position to be used every time. In the machining program 432 in FIG. 32, commands are provided in the "N03" block that the workpiece diameter is 10 mm and the "cut-amount amplitude ratio" is 1.2.

Thread cutting to be performed the first time: a "cut amount" is calculated from the workpiece diameter of 10 mm designated in the X address of the G165 command in the "N03" block and the thread-cutting starting position of 8 mm designated as "X8.0" in the "N10" block, and the amplitude is calculated from "cut amount"×"cut-amount amplitude ratio". Specifically, the "cut amount" is 2 mm from 10−8=2. Accordingly, the amplitude of vibration is determined to be 2.4 mm from "cut amount"×"cut-amount amplitude ratio"=2×1.2=2.4.

Thread cutting to be performed the second time and the third time: the "cut amount" is calculated from the thread-cutting starting position performed the previous time and the thread-cutting starting position performed the current time, and the amplitude is calculated from "cut amount"×"cut-amount amplitude ratio". For example, the amplitude to be used the second time is calculated by calculating the "cut amount" with 8−7.172 from the thread-cutting starting position of 8 mm designated as "X8.0" in the "N10" block and the thread-cutting starting position of 7.172 mm designated as "X7.172" in an "N21" block, and multiplying the result by 1.2, which is the "cut-amount amplitude ratio".

Thread cutting to be performed the fourth time: an amplitude amount is designated as 0.0 mm as designated in an A address of a G32 command in an "N42" block, that is, no superimposition of vibration is designated for the thread cutting to be performed the fourth time.

Although the "cut amount" and the "cut-amount amplitude ratio" are used as values to determine the amplitude in the description above, a "difference between the cut amount and the amplitude" or, directly, the amplitude may be designated. However, when the amplitude amount is directly designated in the A address of the G32 command, the directly designated amplitude amount is used preferentially.

The amplitude of vibration for each of thread cutting processes obtained as described above can be used for calculation of the amount of a preliminary movement to be performed in step S102 in the flowchart, which indicates the operation of a low-frequency vibration thread cutting process according to the second embodiment. That is, the vibration-command analysis unit 452 can obtain the amplitude of vibration from the machining program 432 in FIG. 32 and provide the result to the thread-cutting vibration adjustment unit 484 through the shared area 434.

Figure 33:
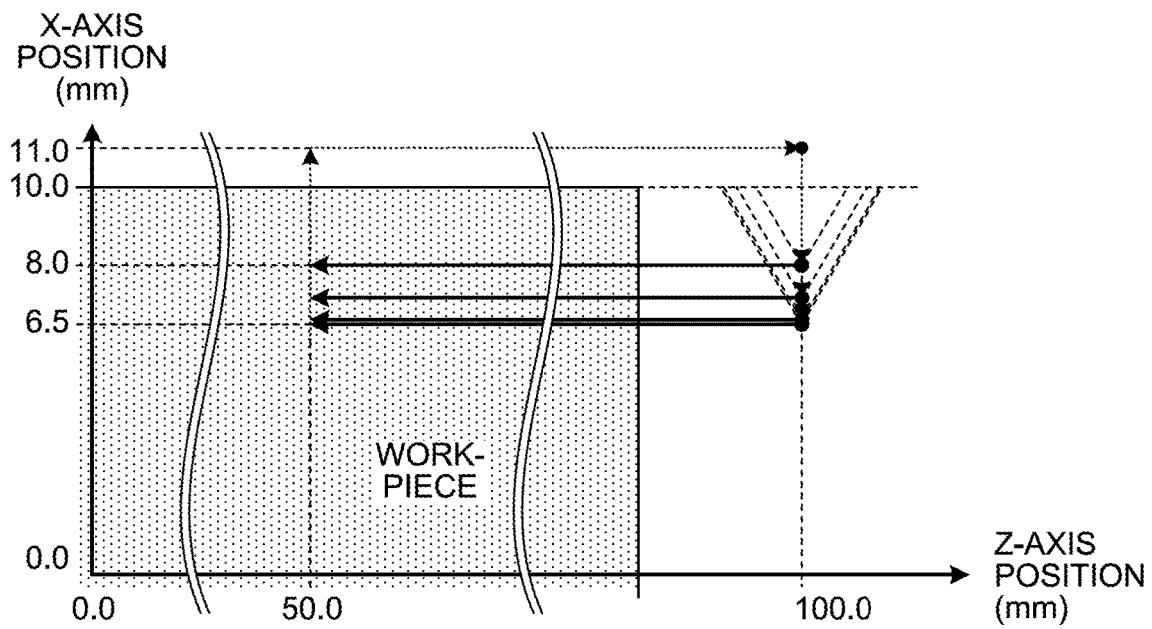
FIG. 33 is a diagram illustrating a program command path in accordance with the machining program in FIG. 32 in the second embodiment.
Figure 34:
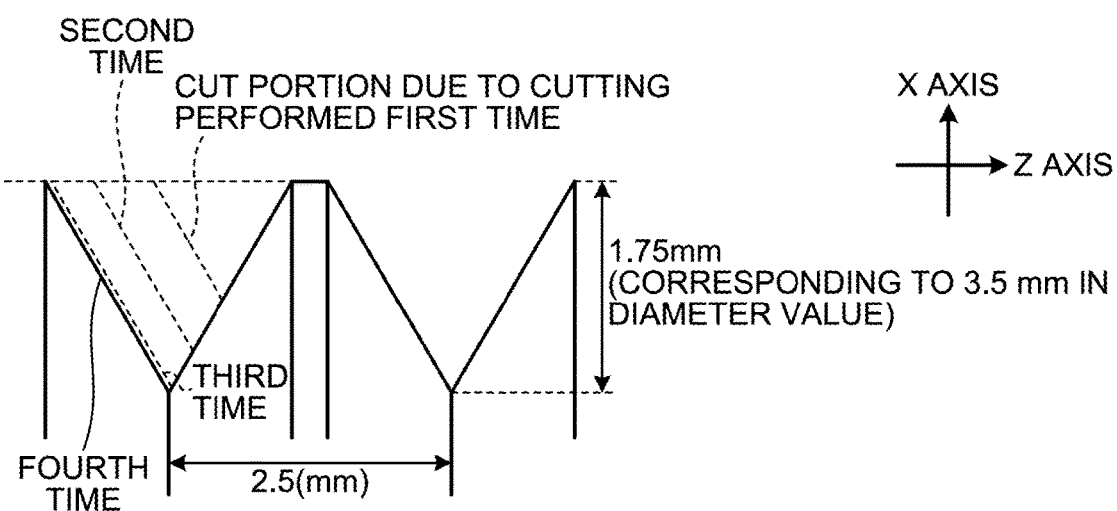
FIG. 34 is a diagram illustrating a machining image in accordance with the machining program in FIG. 32 in the second embodiment.

FIG. 33 is a diagram illustrating a program command path prior to the superimposition of vibration in accordance with the machining program 432 in FIG. 32. The thread-cutting starting position in the Z axis is the same at 100 mm every time from the first time to the fourth time. FIG. 34 is a diagram illustrating a machining image, in a thread groove cross section, in the case of no vibration in accordance with the machining program 432 in FIG. 32. It is assumed that the "single edge cutting" is performed by providing a command such that the "thread-cutting start shift angle" is different every time, as in the (second method) described in the first embodiment.

FIG. 35 is a diagram illustrating the relationship between the main-shaft phase and the X-axis position in the case in which the machining program 432 in FIG. 32 is executed. The diagram indicates that the relationship in which the vibration phase of the vibration indicated by the X-axis position with respect to an identical main-shaft phase is shifted by 180° every time is obtained. FIG. 36 is a diagram illustrating the shift amount of the vibration phase corresponding to the "thread-cutting start shift angle" used every time in the case in which the machining program 432 in FIG. 32 is executed. The vibration phase shift amount to be used the first time is 0°, while the number of times vibration is provided for one rotation of the main shaft is two, that is, the phase shift amount of vibration is twice as much as the phase shift amount of the main shaft, and thus, the vibration phase is shifted by 651.168°, which corresponds to "Q325.584" in "N22" for the second time, and the vibration phase is shifted by 598.176°, which corresponds to "Q299.088" in "N32" for the third time. The fourth time is a finishing process involving no superimposition of vibration.

Example Operation 1-4

FIG. 37 is a diagram illustrating a vibration condition for an example operation 1-4 in the second embodiment. The example operation 1-4 is a case in which the thread-cutting starting position in the Z axis is different for each of the thread cutting processes performed the first time and the second time and the "thread-cutting start shift angle" is different for each of the thread cutting processes performed the first time and the second time. The relationship between the main-shaft phase and the X-axis position of the example operation 1-4 is the same as that in FIG. 30.

FIG. 38 is a diagram illustrating the relationship between the Z-axis position and the X-axis position of the example operation 1-4 in the second embodiment. Unlike FIG. 31 of the example operation 1-3, in thread cutting performed the second time in the example operation 1-4, movement is made to the thread-cutting starting position that is different from that in thread cutting performed the first time until A in FIG. 38 (step S101 in FIG. 23). Then, the preliminary movement is made in the X axis at B in FIG. 38 (step S102). At a point in time when the main shaft reaches the thread-cutting start reference point at C in FIG. 38 (step S103: Yes), the vibration in the X-axis direction is started in the "corrected phase" (step S104). At a point in time when the main shaft reaches the designated thread-cutting start shift angle at D in FIG. 38 (step S105: Yes), the movement in the Z axis is started (step S106).

Modification of Example Operation 1-3

Figure 39:
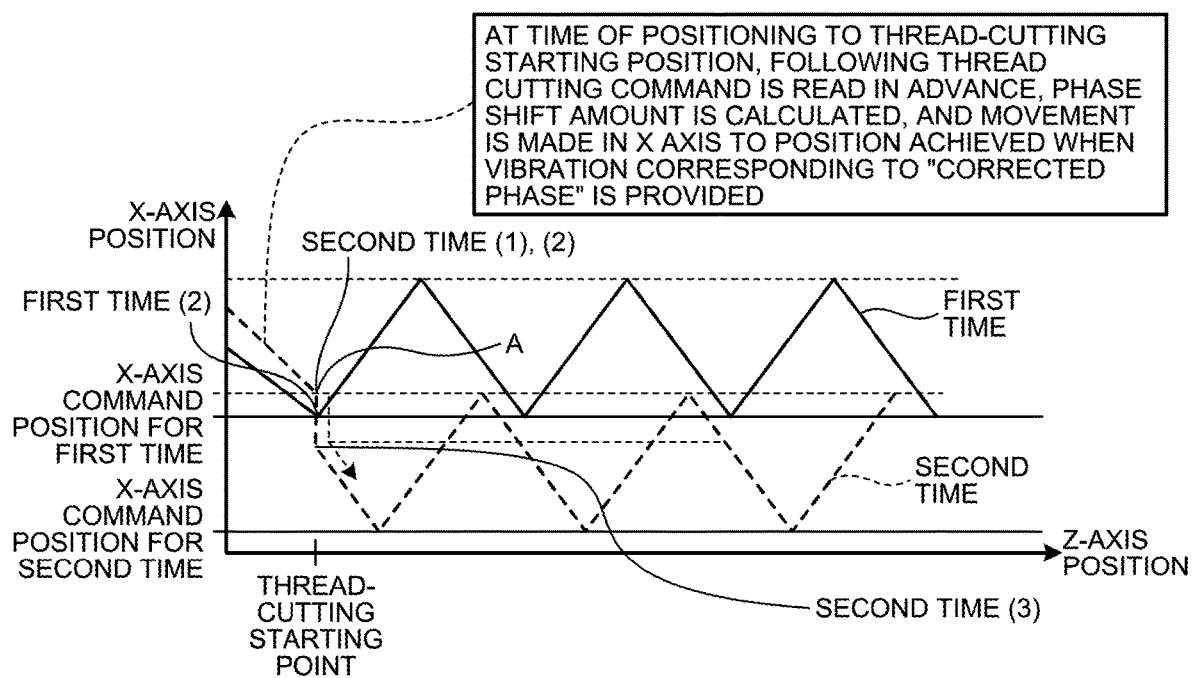
FIG. 39 is a diagram illustrating the relationship between the Z-axis position and the X-axis position of a modification of the example operation 1-3 in the second embodiment.

FIG. 39 is a diagram illustrating the relationship between the Z-axis position and the X-axis position of a modification of the example operation 1-3 illustrated in FIG. 31. In FIG. 39, steps S101 and S102 in FIG. 23 are performed simultaneously to make movement to A in FIG. 39. That is, the movement in the X-axis direction to the vibration starting position may be made simultaneously when the thread-cutting starting positioning is performed. Specifically, at the time of a positioning command to the thread-cutting starting position, a following block of the machining program 432 is read in advance and a preliminary movement amount in the X axis corresponding to the "corrected phase" obtained from the phase shift amount is calculated in advance, and a positioning operation is performed by shifting an end point of the positioning path to the thread-cutting starting position, so that the movement is made to A in FIG. 39. An operation from A and beyond in FIG. 39, that is, from step S103 and beyond, is the same as the operation at C and beyond in FIG. 31. It is possible to make movement in the X axis to the vibration starting position simultaneously when the thread-cutting starting positioning is performed as described above in the example operations 1-1, 1-2, and 1-4.

As described above, the numerical control apparatus 1 according to the second embodiment can adjust the phase of vibration appropriately each time a cut process, to be performed more than once, is performed in a low-frequency vibration thread cutting process and thereby produces the effect of separating chips.

Third Embodiment

Figure 40:
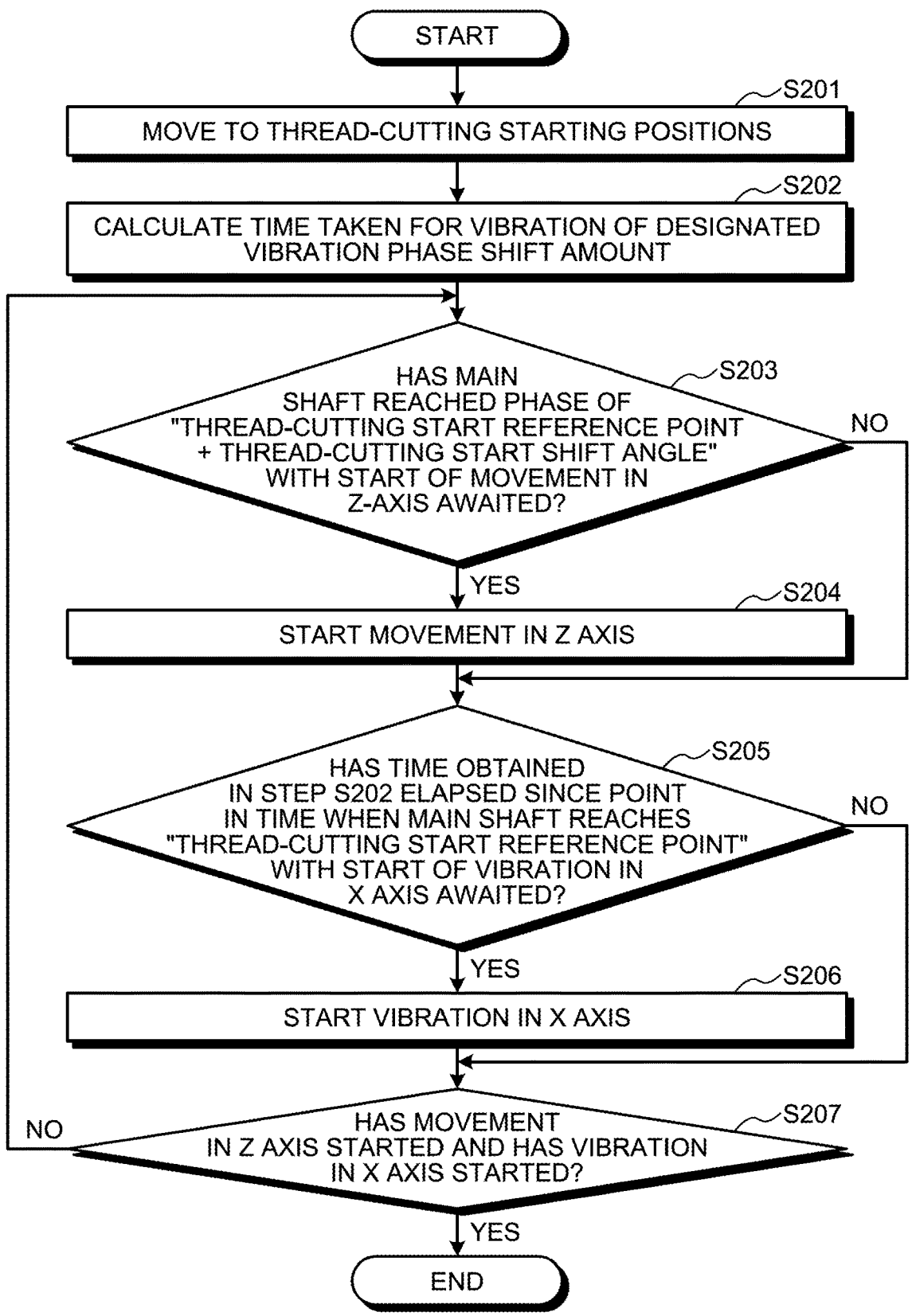
FIG. 40 is a flowchart illustrating an operation of a low-frequency vibration thread cutting process by the numerical control apparatus according to the third embodiment.

FIG. 40 is a flowchart illustrating an operation of a low-frequency vibration thread cutting process by the numerical control apparatus 1 according to a third embodiment. The configuration of the numerical control apparatus 1 is illustrated in FIG. 1 described in the first embodiment. In the third embodiment, the time taken to make movement in the X axis corresponding to a designated phase shift amount is obtained.

Specifically, in step S201 in FIG. 40, the drive unit 10 causes movements to thread-cutting starting positions in the X axis and the Z axis. Then, the thread-cutting vibration adjustment unit 484 calculates the time taken for vibration of a designated phase shift amount of vibration (step S202). The phase shift amount of vibration is a predetermined value and is, for example, 180°.

After step S202, the thread-cutting vibration adjustment unit 484 determines in step S203 whether the main shaft has reached the phase of the "thread-cutting start reference point+thread-cutting start shift angle" with start of movement in the Z axis awaited. At a point in time when the main shaft reaches the phase of the "thread-cutting start reference point+thread-cutting start shift angle" with the start of movement in the Z axis awaited (step S203: Yes), the thread-cutting vibration adjustment unit 484 controls the drive unit 10 such that movement in the Z axis is started (step S204).

After step S204, the thread-cutting vibration adjustment unit 484 determines in step S205 whether the time obtained in step S202 has elapsed since the point in time when the main shaft reaches the thread-cutting start reference point with start of vibration in the X axis awaited. If, in step S203, the movement has started in the Z axis or the main shaft has not reached the phase of the "thread-cutting start reference point+thread-cutting start shift angle" (step S203: No), the flowchart also proceeds to step S205.

Then, at a point in time when the time obtained in step S202 has elapsed since the point in time when the main shaft reaches the thread-cutting start reference point with the start of vibration in the X axis awaited (step S205: Yes), the thread-cutting vibration adjustment unit 484 starts vibration in the X axis in the vibration phase of 0°, that is, the initial phase (step S206).

After step S206, the flowchart proceeds to step S207. If, in step S205, the vibration in the X axis has already started or the time obtained in step S202 has not elapsed since the point in time when the main shaft reaches the thread-cutting start reference point (step S205: No), the flowchart also proceeds to step S207. In step S207, the thread-cutting vibration adjustment unit 484 determines whether the movement in the Z axis has started and the vibration in the X axis has started. If the movement in the Z axis has started and the vibration in the X axis has started (step S207: Yes), the flowchart ends; if the movement in the Z axis has not started or the vibration in the X axis has not started (step S207: No), the flowchart reverts to step S203.

In the flowchart in FIG. 40, if the time obtained in step S202 is longer than the time taken for the main shaft to rotate by the thread-cutting start shift angle, the vibration in the X axis is started (step S206) after the movement in the Z axis is started (step S204). If the time obtained in step S202 is shorter than the time taken for the main shaft to rotate by the thread-cutting start shift angle, the movement in the Z axis is started (step S204) after the vibration in the X axis is started (step S206). If the time obtained in step S202 is equal to the time taken by the main shaft to rotate by the thread-cutting start shift angle, the movement in the Z axis (step S204) and the vibration in the X axis (step S206) are started simultaneously.

The flowchart in FIG. 40 will be described by using a specific example below. While the flowchart in FIG. 40 is performed in a thread cutting process every time, a thread cutting process performed the second time will be mainly used in the description below to facilitate understanding. The flowchart in FIG. 40, which represents an operation with which all of the main shaft, the X axis, and the Z axis are associated, will be described in each of example operations below by using a "diagram illustrating the relationship between the main-shaft phase and the X-axis position" and a "diagram illustrating the relationship between the Z-axis position and the X-axis position".

An (example operation 2-1), an (example operation 2-2), an (example operation 2-3), and an (example operation 2-4) below will be described with an assumption that the time obtained in step S202 is longer than the time taken for the main shaft to rotate by the thread-cutting start shift angle. In these example operations, step S206 is performed after step S204. In contrast, a (modification of the example operation 2-3) will be described in a case in which the time obtained in step S202 is shorter than the time taken for the main shaft to rotate by the thread-cutting start shift angle. In the (modification of the example operation 2-3), step S204 is performed after step S206.

Example Operation 2-1

Figures 41, 42:
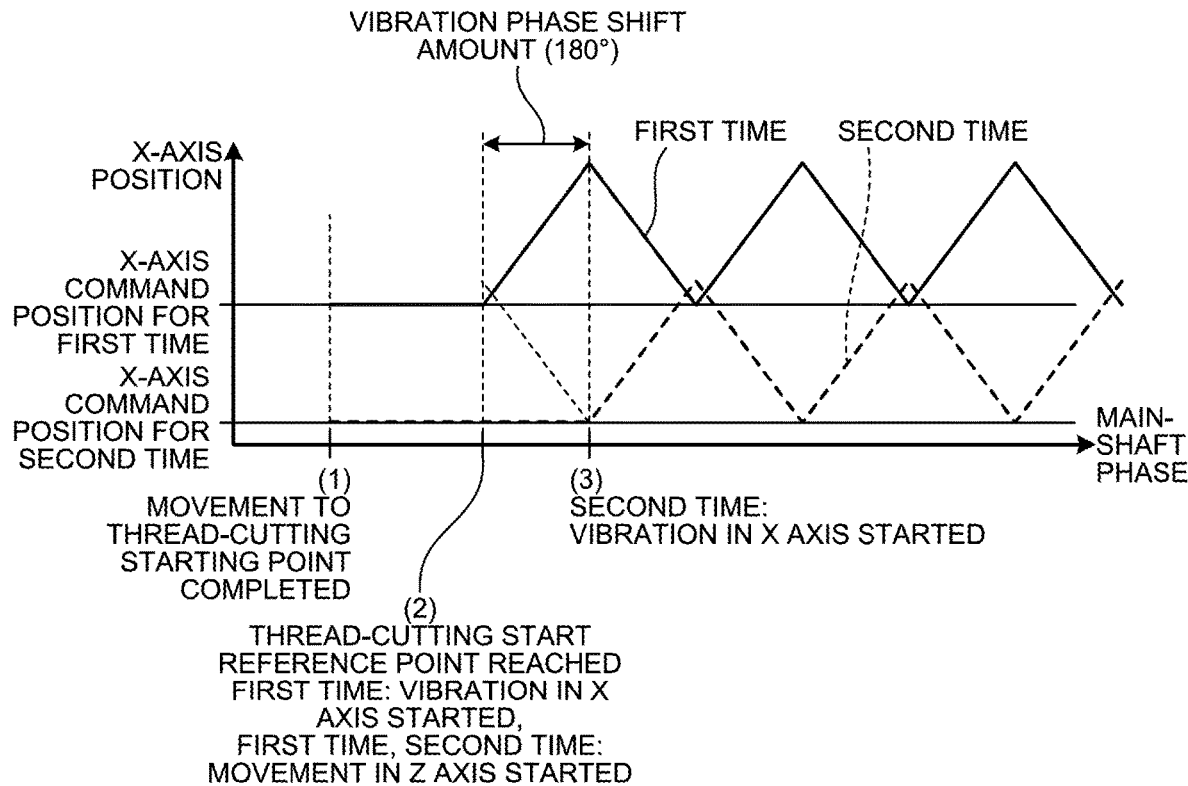
FIG. 41 is a diagram illustrating a vibration condition for an example operation 2-1 in the third embodiment.
FIG. 42 is a diagram illustrating the relationship between the main-shaft phase and the X-axis position of the example operation 2-1 and an example operation 2-2 in the third embodiment.

FIG. 41 is a diagram illustrating a vibration condition for the example operation 2-1 in the third embodiment. The example operation 2-1 is a case in which the thread-cutting starting position in the Z axis is the same in thread cutting processes performed the first time and the second time and the "thread-cutting start shift angle" is the same at 0° in the thread cutting processes performed the first time and the second time.

FIG. 42 is a diagram illustrating the relationship between the main-shaft phase and the X-axis position of the example operation 2-1 in the third embodiment. In the thread cutting process performed the second time, movement in the X axis is made to the thread-cutting starting point until (1) in FIG. 42 (step S201); then, when the main shaft reaches the thread-cutting start reference point at (2) in FIG. 42 (step S203: Yes), movement in the Z-axis direction is started (step S204) as in the case of the first time because of the "thread-cutting start shift angle" at 0°. The time taken for the vibration of the phase shift amount of vibration obtained in step S202 is awaited since the point in time when the main shaft reached the thread-cutting start reference point (step S205: Yes), and then, vibration in the X axis is started at (3) in FIG. 42 in the vibration phase of 0° (step S206). This indicates in FIG. 42 that the relationship is obtained in which the vibration phase of the vibration indicated by the X-axis position with respect to an identical main-shaft phase is shifted between the first time and the second time by 180°.

FIG. 43 is a diagram illustrating the relationship between the Z-axis position and the X-axis position of the example operation 2-1 in the third embodiment. In the thread cutting performed the second time, movement to the thread-cutting starting position is made until A in FIG. 43 (in step S201 in FIG. 40); then, the thread-cutting vibration adjustment unit 484 calculates the time taken for vibration of the designated phase shift amount of vibration (step S202). Because the "thread-cutting start shift angle" is 0° in the example operation 2-1, at the point in time when the main shaft reaches the phase of the thread-cutting start reference point at A in FIG. 43 (step S203: Yes), the movement in the Z axis is started (step S204). Subsequently, while the movement in the Z axis is made, at a point in time when the time obtained in step S202 has elapsed since the point in time when the main shaft reaches the thread-cutting start reference point (step S205: Yes), that is, at B in FIG. 43, the vibration in the X axis is started in the vibration phase of 0° (step S206). After step S206, the flowchart proceeds to step S207, and because the movement in the Z axis has started and the vibration in the X axis has started (step S207: Yes), the flowchart ends.

Example Operation 2-2

FIG. 44 is a diagram illustrating a vibration condition for the example operation 2-2 in the third embodiment. The example operation 2-2 is a case in which the thread-cutting starting position in the Z axis is different for each of the thread cutting processes performed the first time and the second time and the "thread-cutting start shift angle" is the same at 0° in the thread cutting processes performed the first time and the second time. The example operation 2-2 is an operation similar to that in FIG. 20. The relationship between the main-shaft phase and the X-axis position of the example operation 2-2 is the same as that in FIG. 42.

FIG. 45 is a diagram illustrating the relationship between the Z-axis position and the X-axis position of the example operation 2-2 in the third embodiment. In the thread cutting performed the second time, movement to the thread-cutting starting position that is a different Z axis position from that in the first time is made until A in FIG. 45 (step S201 in FIG. 40), and then, the thread-cutting vibration adjustment unit 484 calculates the time taken for vibration of the designated phase shift amount of vibration (step S202). Because the "thread-cutting start shift angle" is 0° in the example operation 2-2, at the point in time when the main shaft reaches the phase of the thread-cutting start reference point at A in FIG. 45 (step S203: Yes), the movement in the Z axis is started (step S204). Subsequently, while the movement in the Z axis is made, at a point in time when the time obtained in step S202 has elapsed since the point in time when the main shaft reaches the thread-cutting start reference point (step S205: Yes), that is, at B in FIG. 45, the vibration in the X axis is started in the vibration phase of 0° (step S206). After step S206, the flowchart proceeds to step S207, and because the movement in the Z axis has started and the vibration in the X axis has started (step S207: Yes), the flowchart ends.

Example Operation 2-3

FIG. 46 is a diagram illustrating a vibration condition for the example operation 2-3 in the third embodiment. The example operation 2-3 is a case in which the thread-cutting starting position in the Z axis is the same in thread cutting processes performed the first time and the second time and the "thread-cutting start shift angle" is different for each of the thread cutting processes performed the first time and the second time. The example operation 2-3 is an operation similar to that in FIG. 22.

Figure 47:
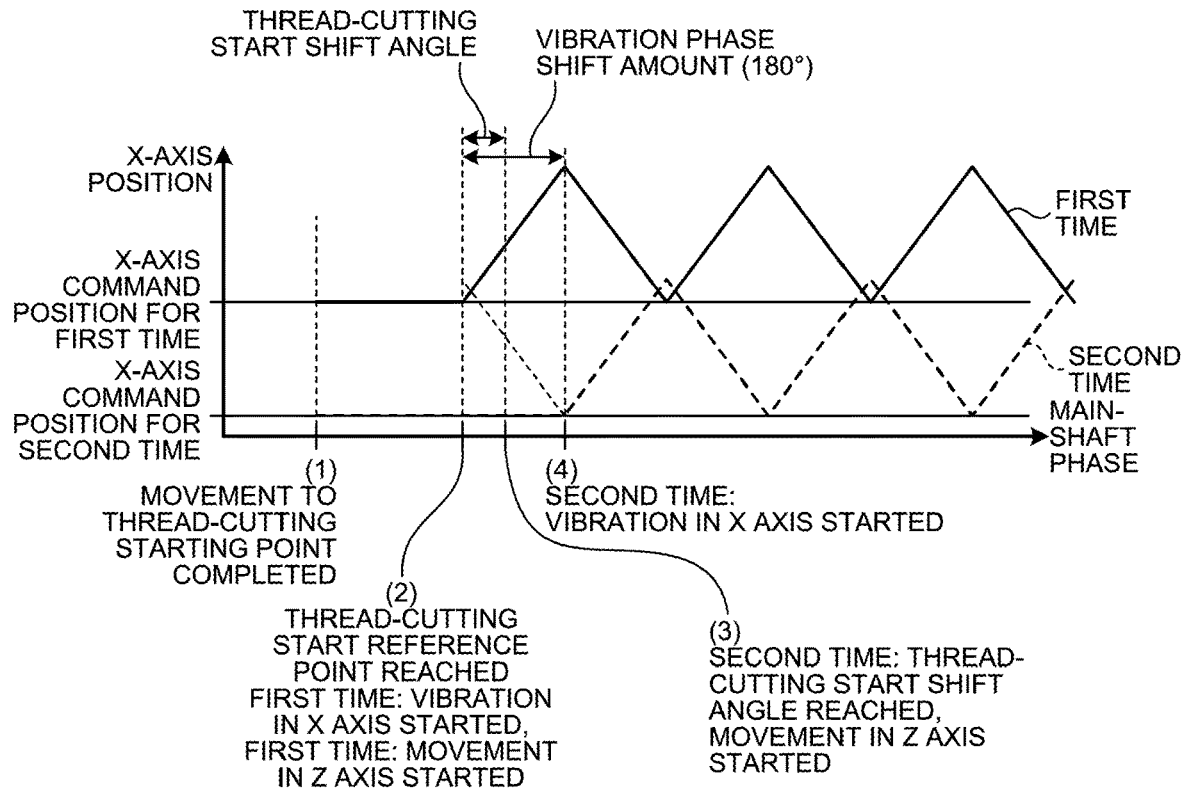
FIG. 47 is a diagram illustrating the relationship between the main-shaft phase and the X-axis position of the example operation 2-3 and an example operation 2-4 in the third embodiment.

FIG. 47 is a diagram illustrating the relationship between the main-shaft phase and the X-axis position of the example operation 2-3 in the third embodiment. In the thread cutting performed the second time, movement in the X axis is made to the thread-cutting starting point until (1) in FIG. 47 (step S201), and then, the main shaft reaches the phase of the thread-cutting start reference point at (2) in FIG. 47. Then, the thread-cutting vibration adjustment unit 484 calculates the time taken for vibration of a designated phase shift amount of vibration (step S202). Subsequently, when the main shaft reaches the phase of the "thread-cutting start reference point+thread-cutting start shift angle" at (3) in FIG. 47 (step S203: Yes), movement in the Z axis is started (step S204). Then, vibration in the X axis is started (step S206) at (4) in FIG. 47, which is the position of the main-shaft phase at the point in time when the time obtained in step S202 has elapsed since the phase of the main shaft reaches the thread-cutting start reference point (step S205: Yes) at (2) in FIG. 47.

Figure 48:
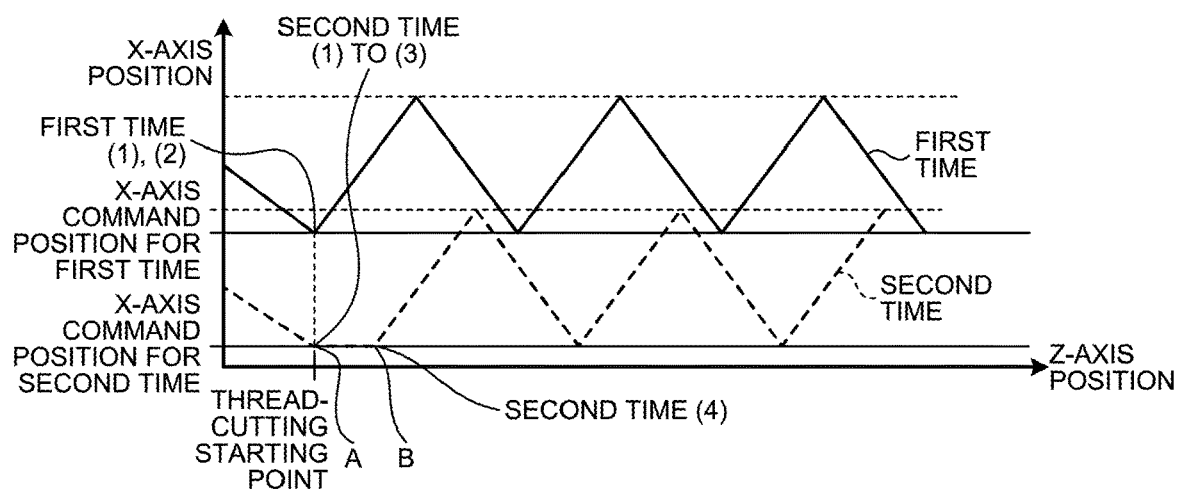
FIG. 48 is a diagram illustrating the relationship between the Z-axis position and the X-axis position of the example operation 2-3 in the third embodiment.

FIG. 48 is a diagram illustrating the relationship between the Z-axis position and the X-axis position of the example operation 2-3 in the third embodiment. In the thread cutting performed the second time, movement to the thread-cutting starting position that is the same Z-axis position as the first time is made at A in FIG. 48 (step S201), and the thread-cutting vibration adjustment unit 484 calculates the time taken for vibration of the designated phase shift amount of vibration (step S202). Then, at the point in time when the main shaft reaches the phase of the "thread-cutting start reference point+thread-cutting start shift angle" at A in FIG. 48 (step S203: Yes), the movement in the Z axis is started (step S204). Subsequently, while the movement in the Z axis is made, at the point in time when the time obtained in step S5202 has elapsed since the point in time when the main shaft reaches the thread-cutting start reference point (step S205: Yes), that is, at B in FIG. 48, the vibration in the X axis is started in the vibration phase of 0° (step S206). After step S206, the flowchart proceeds to step S207, and because the movement in the Z axis has started and the vibration in the X axis has started (step S207: Yes), the flowchart ends.

As described in the beginning of the third embodiment, if the time obtained in step S202 is shorter than the time taken for the main shaft to rotate by the thread-cutting start shift angle, the determination in (step S205: Yes) is made before the determination in (step S203: Yes). That is, in step S205, to which the flowchart proceeds when the main shaft has not reached the phase of the "thread-cutting start reference point+thread-cutting start shift angle" in step S203 (step S203: No), the time obtained in step S202 elapses since the point in time when the main shaft reaches the thread-cutting start reference point (step S205: Yes), and the vibration in the X axis is started in the vibration phase of 0°, that is, in the initial phase (step S206). That is, step S206 is performed first, and then, step S204 is performed. In the (modification of the example operation 2-3) below, such a case will be described.

Modification of the Example Operation 2-3

The vibration condition of the modification of the example operation 2-3 is the same as that in FIG. 46. That is, the modification of the example operation 2-3 is also a case in which the thread-cutting starting position in the Z axis is the same in thread cutting processes performed the first time and the second time and the "thread-cutting start shift angle" is different for each of the thread cutting processes performed the first time and the second time. Thus, the modification of the example operation 2-3 is also an operation similar to that in FIG. 22.

Figure 49:
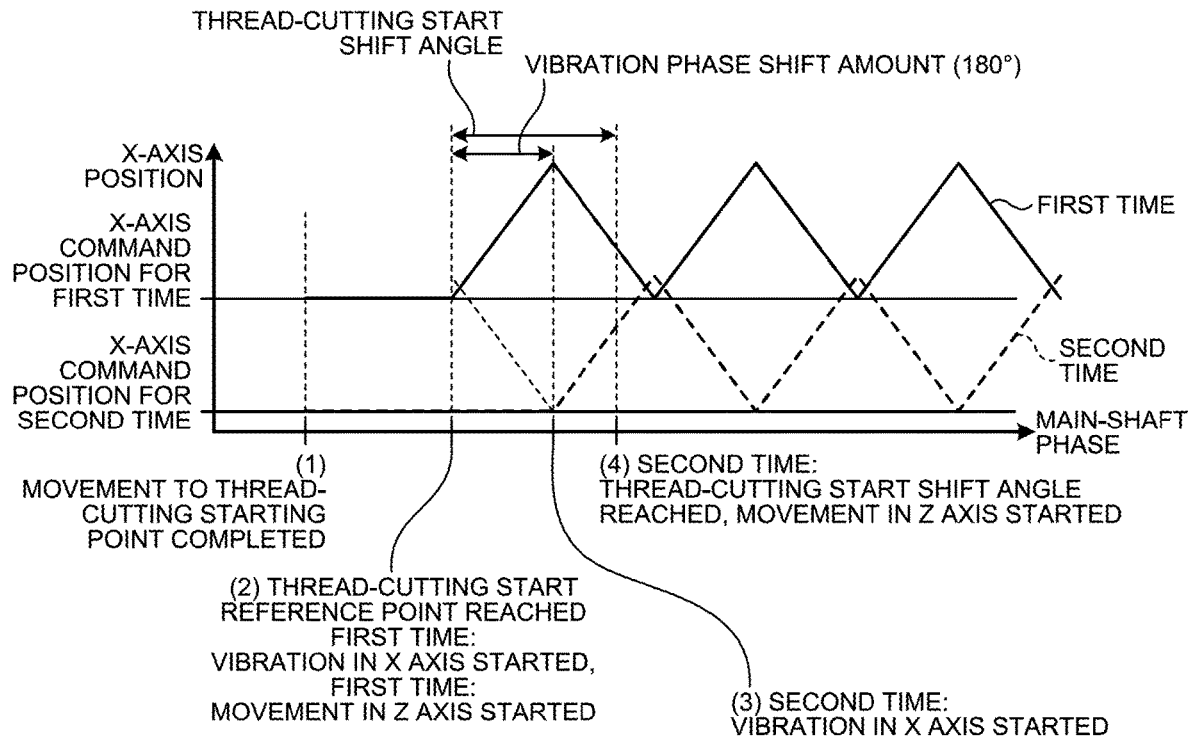
FIG. 49 is a diagram illustrating the relationship between the main-shaft phase and the X-axis position of a modification of the example operation 2-3 in the third embodiment.

FIG. 49 is a diagram illustrating the relationship between the main-shaft phase and the X-axis position of the modification of the example operation 2-3 in the third embodiment. In the thread cutting performed the second time, movement in the X axis is made to the thread-cutting starting point until (1) in FIG. 49 (step S201), and then, the main shaft reaches the phase of the thread-cutting start reference point at (2) in FIG. 49. Then, the thread-cutting vibration adjustment unit 484 calculates the time taken for vibration of a designated phase shift amount of vibration (step S202). Then, at (3) in FIG. 49, which is a point in time when the time obtained in step S202 has elapsed since the point in time when the main shaft reaches the thread-cutting start reference point (step S205: Yes) in step S205, to which the flowchart proceeds when the main shaft has not reached the phase of the "thread-cutting start reference point+thread-cutting start shift angle" in step S203 (step S203: No), vibration in the X axis is started (step S206).

After step S206, the flowchart proceeds to step S207, and because the movement in the Z axis has not started (step S207: No), the flowchart reverts to step S203. Then, when the main shaft reaches the phase of the "thread-cutting start reference point+thread-cutting start shift angle" at (4) in FIG. 49 (step S203: Yes), movement in the Z axis is started (step S204). Because, in step S205 after step S204, the vibration in the X axis has already started (step S205: No), the flowchart proceeds to step S207 without going through step S206, and, because the movement in the Z axis has started and the vibration in the X axis has started (step S207:

Yes), the flowchart ends. As described above, in the modification of the example operation 2-3, step S206 is performed before step S204.

Figure 50:
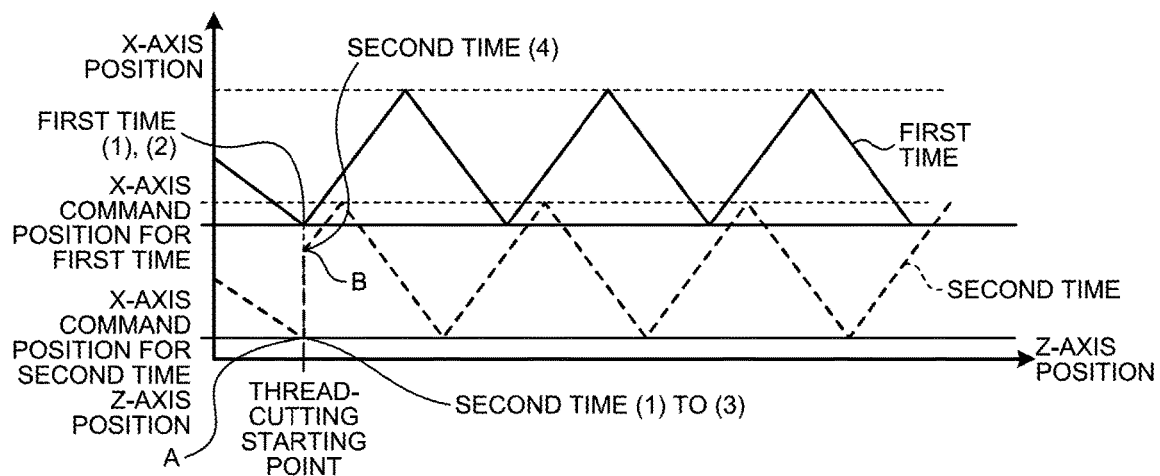
FIG. 50 is a diagram illustrating the relationship between the Z-axis position and the X-axis position of the modification of the example operation 2-3 in the third embodiment.

FIG. 50 is a diagram illustrating the relationship between the Z-axis position and the X-axis position of the modification of the example operation 2-3 in the third embodiment. In the thread cutting performed the second time, movement to the thread-cutting starting position that is the same Z-axis position as the first time is made at A in FIG. 50 (step S201), and the thread-cutting vibration adjustment unit 484 calculates the time taken for vibration of the designated phase shift amount of vibration (step S202). Then, at the point in time when the time obtained in step S202 has elapsed since the point in time when the main shaft reaches the thread-cutting start reference point (step S205: Yes), that is, at A in FIG. 50, the vibration in the X axis is started in the vibration phase of 0° (step S206). Subsequently, at the point in time when the main shaft reaches the phase of the "thread-cutting start reference point+thread-cutting start shift angle" at B in FIG. 50 (step S203: Yes), the movement in the Z axis is started (step S204).

Example Operation 2-4

FIG. 51 is a diagram illustrating a vibration condition for the example operation 2-4 in the third embodiment. The example operation 2-4 is a case in which the thread-cutting starting position in the Z axis is different for each of the thread cutting processes performed the first time and the second time and the "thread-cutting start shift angle" is different for each of the thread cutting processes performed the first time and the second time. The relationship between the main-shaft phase and the X-axis position in the example operation 2-4 is the same as that in FIG. 47.

FIG. 52 is a diagram illustrating the relationship between the Z-axis position and the X-axis position of the example operation 2-4 in the third embodiment. In the thread cutting performed the second time, movement to the thread-cutting starting position that is a different Z-axis position from that in the first time is made at A in FIG. 52 (step S201), and the thread-cutting vibration adjustment unit 484 calculates the time taken for vibration of the designated phase shift amount of vibration (step S202). Then, at the point in time when the main shaft reaches the phase of the "thread-cutting start reference point+thread-cutting start shift angle" at A in FIG. 52 (step S203: Yes), the movement in the Z axis is started (step S204). Subsequently, while the movement in the Z axis is made, at the point in time when the time obtained in step S202 has elapsed since the point in time when the main shaft reaches the thread-cutting start reference point (step S205: Yes), that is, at B in FIG. 52, the vibration in the X axis is started in the vibration phase of 0° (step S206). After step S206, the flowchart proceeds to step S207, and because the movement in the Z axis has started and the vibration in the X axis has started (step S207: Yes), the flowchart ends.

As described above, the numerical control apparatus 1 according to the third embodiment can adjust the phase of vibration appropriately each time a cut process, to be performed more than once, is performed in a low-frequency vibration thread cutting process and thereby produces the effect of separating chips.

Fourth Embodiment

The configuration of the numerical control apparatus 1 according to a fourth embodiment is similar to that in FIG. 1. FIG. 53 is a diagram illustrating an example of the machining program 432 according to the fourth embodiment. In the machining program 432 in FIG. 53, determination of the amplitude of vibration to be used in thread cutting to be performed the first time is similar to determination of the amplitude of vibration to be used in the thread cutting to be performed the first time in the (example operation 1-3) of the second embodiment.

That is, in a G165 command in an "N03" block in FIG. 53, a workpiece diameter is designated as 10.0 mm in an X address, and the "cut-amount amplitude ratio" is designated as 1.2 in a Q address. In an "N10" block, the position of 7.0 mm of the X axis for starting thread cutting the first time is designated as "X7.0". Accordingly, the "cut amount" is 10−7=3 mm, and the amplitude of vibration for the thread cutting to be performed the first time is determined to be 3.6 mm from "cut amount"×"cut-amount amplitude ratio"=3×1.2=3.6.

In contrast, in a G32 command in "N22", "N32", and "N42" blocks, which provide commands for thread cutting processes to be performed the second time, the third time, and the fourth time, the amplitude amount is directly designated in the A addresses as "A3.6", "A3.6", and "A0.0". In this case, as described in the (example operation 1-3) in the second embodiment, such a designated amount in the A address is used as the amplitude. Accordingly, the amplitudes of vibration to be used in the thread cutting processes performed the second time, the third time, and the fourth time are 3.6 mm, 3.6 mm, and 0.0 mm, respectively. That is, the machining performed the fourth time is a finishing process, and thus, no vibration is superimposed.

Furthermore, in the "N22" block, which provides a command for the thread cutting process to be performed the second time, and in the "N32" block, which provides a command for the thread cutting process to be performed the third time, the phase shift amount of vibration is designated as "R120" and "R240", that is, 120° and 240° for the respective thread cutting processes.

Figure 54:
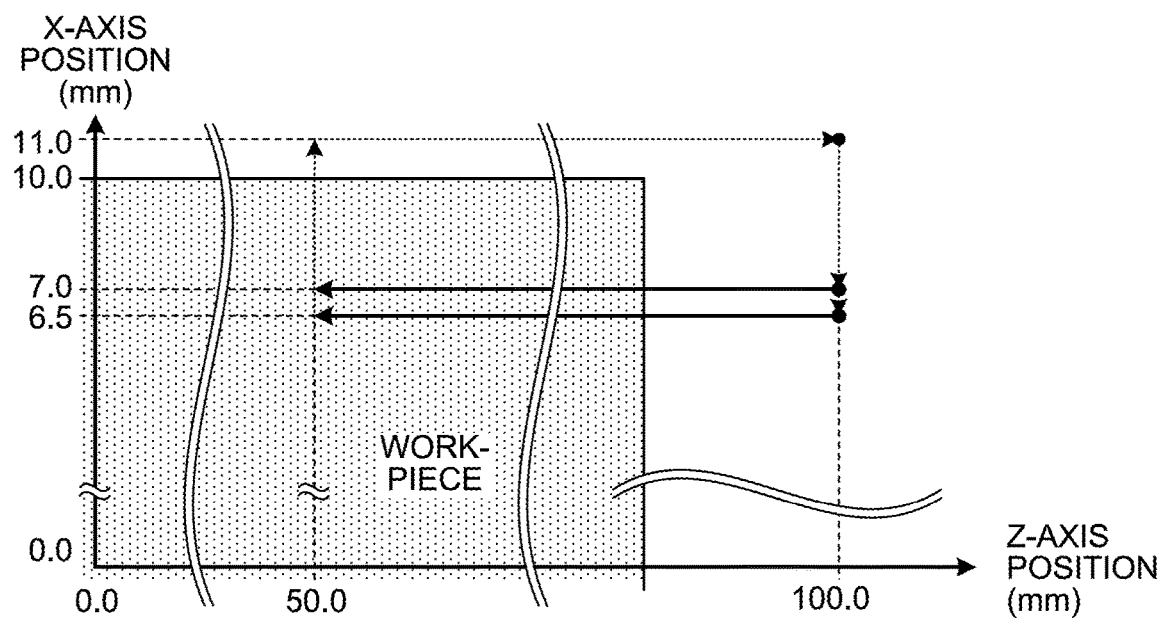
FIG. 54 is a diagram illustrating a program command path in accordance with the machining program in FIG. 53 in the fourth embodiment.
Figure 55:
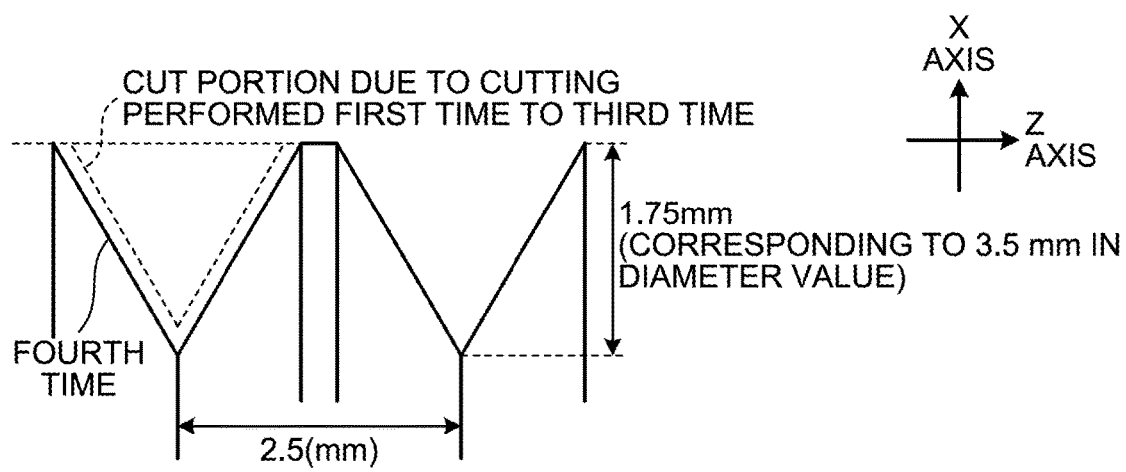
FIG. 55 is a diagram illustrating a machining image in accordance with the machining program in FIG. 53 in the fourth embodiment.

FIG. 54 is a diagram illustrating a program command path prior to the superimposition of vibration in accordance with the machining program 432 in FIG. 53. The thread-cutting starting position in the Z axis is the same at 100 mm every time from the first time to the fourth time. FIG. 55 is a diagram illustrating a machining image, in a thread groove cross section, in the case of no vibration in accordance with the machining program 432 in FIG. 53. As illustrated in FIG. 54 and FIG. 55, the command path, which excludes vibration, to be used in the thread cutting processes involving vibration performed the first time to the third time is the same.

By designating the amplitude of vibration and the phase shift amount of vibration in the machining program 432 illustrated in FIG. 53, the vibration-command analysis unit 452 obtains the amplitude of vibration and the phase shift amount of vibration from the machining program 432. The vibration-command analysis unit 452 provides the amplitude and the phase shift amount to the thread-cutting vibration adjustment unit 484 through the shared area 434. The thread-cutting vibration adjustment unit 484 is enabled to cause the drive unit 10 to perform the operations described in the first to third embodiments on the basis of these vibration conditions.

Figure 56:
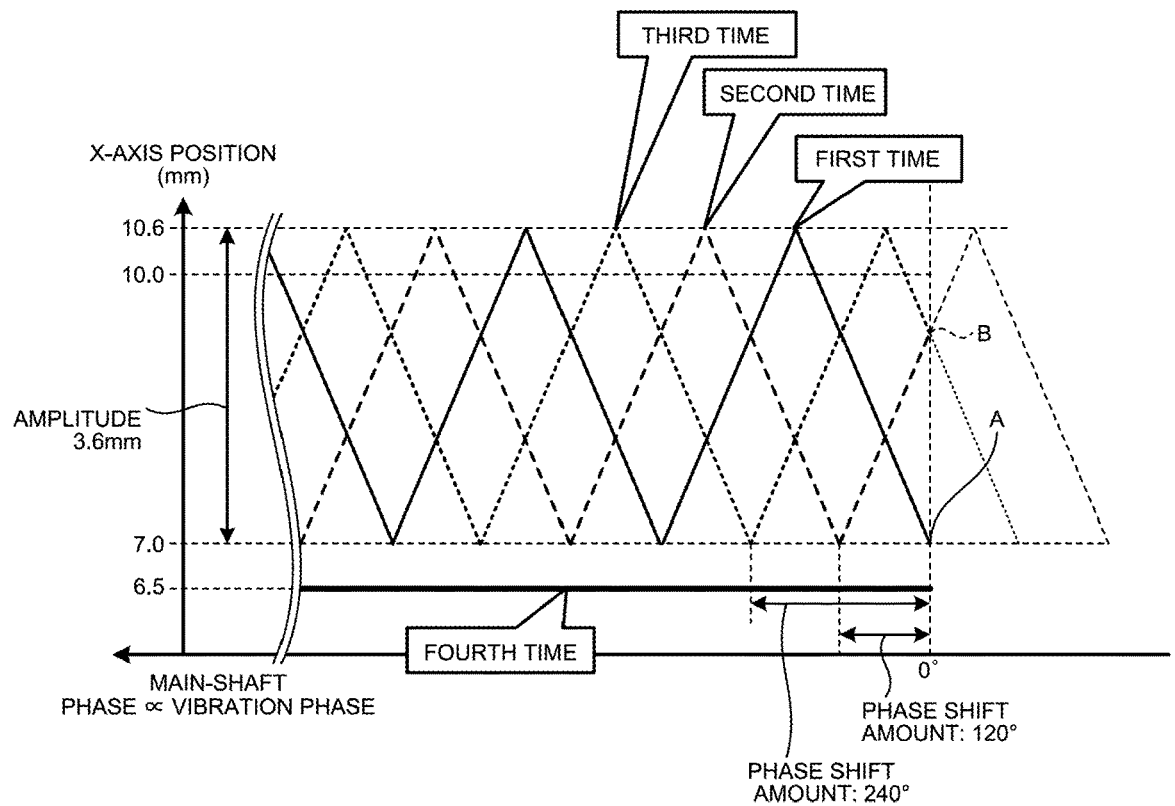
FIG. 56 is a diagram illustrating the relationship between the main-shaft phase and the X-axis position in a case in which the machining program in FIG. 53 is accomplished with a preliminary movement performed in the fourth embodiment.

FIG. 56 is a diagram illustrating the relationship between the main-shaft phase and the X-axis position in a case in which the machining program 432 of FIG. 53 is accomplished with a preliminary movement in step S102 of FIG.

23 described in the second embodiment performed. In FIG. 56, the main-shaft phase is proportional to the vibration phase.

In a thread cutting process performed the first time in FIG. 56, the phase shift amount of vibration is 0°, and thus, the "corrected phase" is 0°. Because the preliminary movement in the X-axis direction corresponding to the phase of the "corrected phase"=0° is zero, no preliminary movement is performed. In the thread cutting performed the first time, the main shaft achieves the main-shaft phase of 0°, which is the phase of the thread-cutting start reference point (step S103: Yes), at A in FIG. 56, at which vibration is started in the initial phase.

In a thread cutting process performed the second time in FIG. 56, the phase shift amount of vibration is 120°, and thus, the "corrected phase" that is obtained by shifting from the reference phase of 0° in a minus direction by 120° and normalizing with 360° is 240°. The position reached by following the preliminary movement in the X-axis direction corresponding to the phase of the "corrected phase"=240° is B in FIG. 56. In the thread cutting performed the second time, the main shaft achieves the main-shaft phase of 0°, which is the phase of the thread-cutting start reference point, (step S103: Yes) at B in FIG. 56, at which vibration is started in the "corrected phase"=240° (step S104).

In a thread cutting process performed the third time in FIG. 56, the phase shift amount of vibration is 240°, and thus, the "corrected phase" is 120°. The position reached by following the preliminary movement in the X-axis direction corresponding to the phase of the "corrected phase"=120° is B in FIG. 56. In the thread cutting performed the third time, the main shaft achieves the main-shaft phase of 0°, which is the phase of the thread-cutting start reference point, (step S103: Yes) at B in FIG. 56, at which vibration is started in the "corrected phase"=120° (step S104). A thread cutting process performed for the fourth time in FIG. 56 is a finishing process involving no superimposition of vibration.

Figure 57:
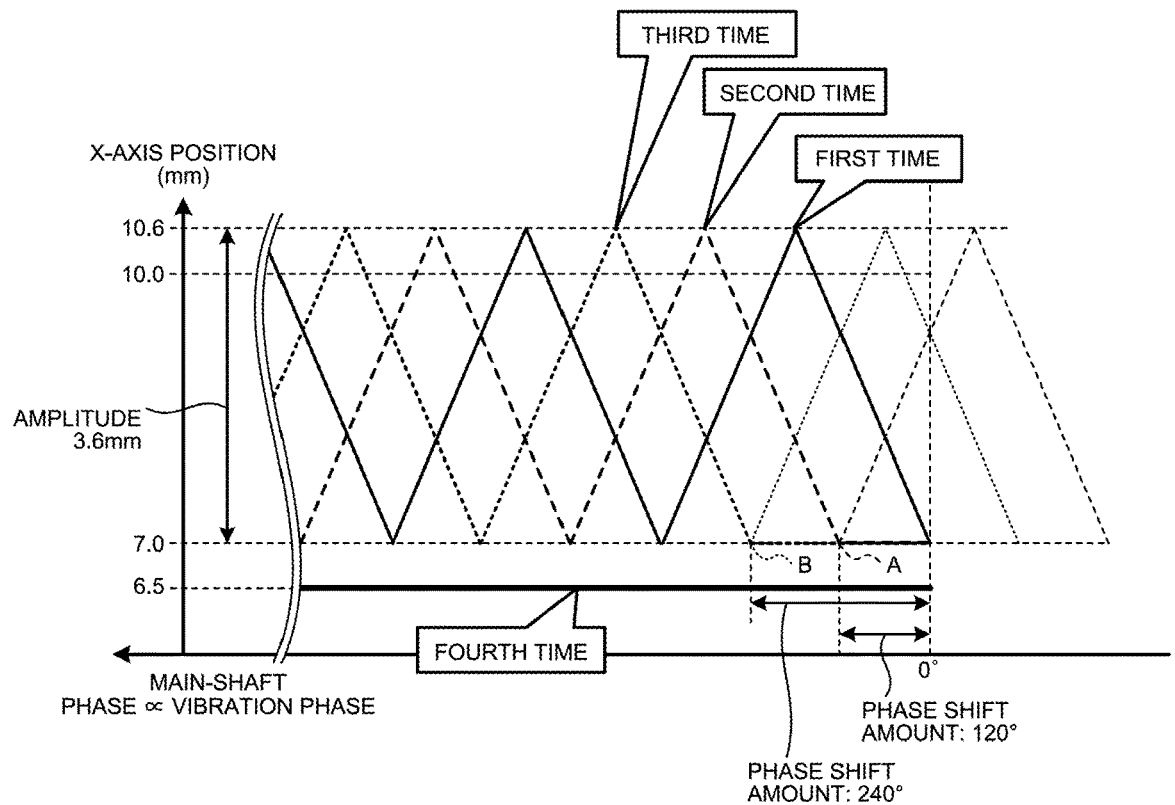
FIG. 57 is a diagram illustrating the relationship between the main-shaft phase and the X-axis position in a case in which the machining program in FIG. 53 is accomplished with start of vibration delayed by the time taken for the vibration of the phase shift amount of vibration in the fourth embodiment.

FIG. 57 is a diagram illustrating the relationship between the main-shaft phase and the X-axis position in a case in which the machining program 432 of FIG. 53 is accomplished with start of vibration delayed by the time taken for the vibration of the phase shift amount obtained in step S202 in FIG. 40 described in the third embodiment. In FIG. 57, the main-shaft phase is proportional to the vibration phase.

Thread cutting processes performed the first time and the fourth time in FIG. 57 are the same as those in FIG. 56. In a thread cutting process performed the second time in FIG. 57, the phase shift amount of vibration is 120°, and thus, the time taken for the vibration of the phase of 120° is obtained (step S202), and the time taken for this vibration elapses since the main shaft achieves the main-shaft phase of 0°, which is the phase of the thread-cutting start reference point, (step S205: Yes) at A in FIG. 57, at which vibration is started in the initial phase (step S206).

In a thread cutting process performed the third time in FIG. 57, the phase shift amount of vibration is 240°, and thus, the time taken for the vibration of the phase of 240° is obtained (step S202), and the time taken for this vibration elapses since the main shaft achieves the main-shaft phase of 0°, which is the phase of the thread-cutting start reference point, (step S205: Yes) at B in FIG. 57, at which vibration is started in the initial phase (step S206).

As described above, the numerical control apparatus 1 according to the fourth embodiment can adjust the phase of vibration appropriately each time a cut process, to be performed more than once, is performed on the basis of the amplitude of vibration and the phase shift amount of vibration designated in the machining program 432 in a low-frequency vibration thread cutting process and thereby produces the effect of separating chips.

The configuration described in each of the embodiments described above represents an example of the content of the present invention; combining the present invention with other publicly known techniques is possible, and partial omissions and other modifications are of course possible without departing from the spirit of the present invention.

REFERENCE SIGNS LIST 1 numerical control apparatus, 10 drive unit, 11 servomotor, 12,15 detector, 13X X-axis servo control unit, 13Z Z-axis servo control unit, 14 main-shaft motor, main-shaft control unit, 20 input operation unit, 30 display unit, 40 control arithmetic unit, 41 input control unit, 42 data setting unit, 43 storage unit, 44 screen processing unit, 45 analysis processing unit, 46 machine control signal processing unit, 47 PLC circuit unit, 48 interpolation processing unit, 49 acceleration/deceleration processing unit, 50 axis data output unit, 61 workpiece, 62 tool, 431 parameter, 432 machining program, 433 screen display data, 434 shared area, 451 movement-command generation unit, 452 vibration-command analysis unit, 481 command movement amount calculation unit, 482 vibration movement amount calculation unit, 483 movement amount superimposition unit, 484 thread-cutting vibration adjustment unit.

The invention claimed is:

1. A numerical control apparatus that performs a thread cutting process for forming a thread on a workpiece by moving a cutting tool and the workpiece relative to each other and performing a cut process more than once on the workpiece, the numerical control apparatus comprising:
a drive controller to control a main shaft that rotates the workpiece and a drive shaft that feeds to move the cutting tool relatively to the workpiece in a direction perpendicular to a direction of a rotation axis of the main shaft; and
at least one processor to implement:
a vibration unit to superimpose, on movement of the drive shaft, a vibration that is a reciprocating feed movement; and
a thread-cutting vibration adjustment unit to control the drive controller such that a phase of the vibration is shifted with respect to a phase of the main shaft by a predetermined vibration phase shift amount every time in the cut process performed more than once.

2. The numerical control apparatus according to claim 1, wherein the thread-cutting vibration adjustment unit causes the drive shaft to make a preliminary movement from a vibration start reference position to a vibration position in a corrected phase that is obtained by causing a vibration phase to shift by the vibration phase shift amount and, after the preliminary movement, causes the vibration to start in the corrected phase at a point in time when the main shaft achieves a phase of a thread-cutting start reference point that is a reference phase.

3. The numerical control apparatus according to claim 1, wherein the thread-cutting vibration adjustment unit obtains a time taken for the vibration of the vibration phase shift amount and causes the drive shaft to start the vibration in an initial phase at a point in time obtained by adding, to the point in time when the main shaft achieves a phase of a thread-cutting start reference point that is a reference phase, the time taken for the vibration.

4. The numerical control apparatus according to claim 1, wherein the reciprocating feed movement is in a direction perpendicular to a surface of the workpiece.

* * * * *